United States Patent [19]

Tzikas

[11] Patent Number: 5,233,026
[45] Date of Patent: Aug. 3, 1993

[54] AZO DYES CONTAINING CHLORO-S-TRIAZINE AND VINYLSULFONYL TYPE FIBER-REACTIVE GROUPS

[75] Inventor: Athanassios Tzikas, Pratteln, Switzerland

[73] Assignee: Ciba-Geigy Corporation, Ardsley, N.Y.

[21] Appl. No.: 740,656

[22] Filed: Aug. 2, 1991

Related U.S. Application Data

[63] Continuation of Ser. No. 483,283, Feb. 20, 1990, abandoned, which is a continuation of Ser. No. 210,220, Jun. 17, 1988, abandoned, which is a continuation of Ser. No. 58,621, Jun. 4, 1987, abandoned, which is a continuation of Ser. No. 777,902, Sep. 19, 1985, abandoned.

[30] Foreign Application Priority Data

Sep. 26, 1984 [CH] Switzerland .................. 4612/84

[51] Int. Cl.$^5$ .................. C09B 62/085; C09B 62/51; D06P 1/382; D06P 3/66
[52] U.S. Cl. .................. 534/636; 534/617; 534/628; 534/629; 534/630; 534/631; 534/632; 534/633; 534/634; 534/635; 534/637; 534/638; 534/642
[58] Field of Search .................. 534/628–638, 534/642, 617

[56] References Cited

U.S. PATENT DOCUMENTS

| | | | |
|---|---|---|---|
| 3,223,470 | 12/1965 | Boedeker et al. | 534/638 X |
| 4,341,699 | 7/1982 | Tezuka et al. | 534/638 |
| 4,378,313 | 3/1983 | Kayane et al. | 534/638 |
| 4,515,598 | 5/1985 | Meininger et al. | 8/549 |
| 4,585,460 | 4/1986 | Schwander et al. | 8/548 |
| 4,713,082 | 12/1987 | Scheibli et al. | 8/549 |

FOREIGN PATENT DOCUMENTS

| | | | |
|---|---|---|---|
| 0040790 | 6/1981 | European Pat. Off. | 534/638 |
| 0040806 | 12/1981 | European Pat. Off. | 534/638 |
| 0069376 | 1/1983 | European Pat. Off. | 534/617 |
| 0079563 | 5/1983 | European Pat. Off. | 534/617 |
| 0084849 | 8/1983 | European Pat. Off. | 534/617 |
| 0032187 | 12/1983 | European Pat. Off. | 534/638 |
| 0111288 | 6/1984 | European Pat. Off. | 534/617 |
| 0111830 | 6/1984 | European Pat. Off. | 534/617 |
| 0115705 | 8/1984 | European Pat. Off. | 534/617 |
| 1265698 | 4/1968 | Fed. Rep. of Germany | 534/617 |
| 2949034 | 6/1981 | Fed. Rep. of Germany | 534/638 |
| 3113473 | 2/1982 | Fed. Rep. of Germany | 534/617 |
| 2648863 | 12/1963 | Japan | 534/617 |
| 45-10789 | 6/1967 | Japan | 534/617 |
| 57-57754 | 4/1982 | Japan | 534/617 |

*Primary Examiner*—Floyd D. Higel
*Attorney, Agent, or Firm*—Kevin T. Mansfield; Edward McC. Roberts

[57] ABSTRACT

Reactive dyes of the formula

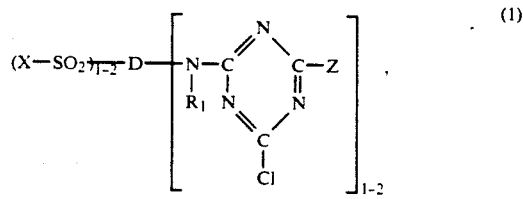

in which D is a monoazo dye, $R_1$ is hydrogen or a substituted or unsubstituted $C_{1-4}$alkyl radical, Z is an unsubstituted or substituted amino group, and X is a vinyl, $\beta$-sulfatoethyl, $\beta$-thiosulfatoethyl, $\beta$-chloroethyl or $\beta$-acetoxyethyl group, with the condition that Z is not a sulfo- or carboxyl-substituted phenylamino group when the triazine radical is bonded to the radical of 1,8-aminonaphthol-3,6- or -4,6-disulfonic acid, and the X—SO$_2$ radical is bonded directly to an aromatic C atom, are suitable in particular for dyeing and printing cellulose-containing fiber materials by the cold pad-batch method and produce, in high dyeing yields, dyeings and prints having good fastness properties.

10 Claims, No Drawings

AZO DYES CONTAINING CHLORO-S-TRIAZINE AND VINYLSULFONYL TYPE FIBER-REACTIVE GROUPS

This is a continuation of Ser. No. 483,283, filed Feb. 20, 1990, now abandoned, which in turn is a continuation of Ser. No. 210,220, filed Jun. 17, 1988, now abandoned, which in turn is a continuation of Ser. No. 058,621, filed Jun. 4, 1987, now abandoned, which in turn is a continuation of Ser. No. 777,902, filed Sep. 19, 1985, now abandoned.

The present invention relates to novel reactive dyes, to a process for their preparation and to their use for dyeing or printing fiber materials.

The practise of dyeing with reactive dyes has recently led to increased demands on the quality of the dyeings and on the economics of the dyeing process. There consequently continues to be a demand for new reactive dyes which have improved properties, in particular application properties.

The present demand in the dyeing of cotton by the cold pad-batch method is for reactive dyes which have adequate substantivity at the low dyeing temperature and which also have good washoff properties with respect to the unfixed portions. They should also have a high reactivity, so that only short batching times are necessary, and they should in particular produce dyeings having high degrees of fixation. These demands are met only inadequately by known dyes.

The present invention therefore has for its object to find new, improved reactive dyes for the cold pad-batch method which have the qualities characterized above to a high degree. The new dyes should be distinguished in particular by high degrees of fixation and high fiber-dye bond stabilities, and moreover the portions not fixed on the fiber should be readily washed off. They should furthermore produce dyeings having good all-round fastness properties, for example light and wet fastness properties.

It has been found that this object is achieved with the novel bireactive dyes defined hereinafter.

The invention accordingly provides reactive dyes of the formula

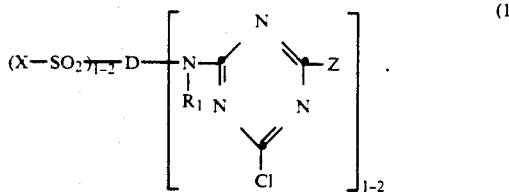

(1)

in which D is a monoazo dye, $R_1$ is hydrogen or a substituted or unsubstituted $C_{1-4}$-alkyl radical, Z is an unsubstituted or substituted amino group, and X is a vinyl, $\beta$-sulfatoethyl, $\beta$-thiosulfatoethyl, $\beta$-chloroethyl or $\beta$-acetoxyethyl group, with the condition that Z is not a sulfo- or carboxyl-substituted phenylamino group when the triazine radical is bonded to the radical of 1,8-aminonaphthol-3,6- or -4,6-disulfonic acid, and the $X-SO_2$ radical is bonded directly to an aromatic C atom.

The radical D in the formula (I) can be substituted in conventional manner. Examples of further substituents on the radical D are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-$\beta$-hydroxyethylamino, N,N-di-$\beta$-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-propylsulfamoyl, N-isopropylsulfamoyl or N-butylsulfamoyl, N-(4-hydroxyethyl)-sulfamoyl, N,N-di-($\beta$-hydroxyethyl)sulfamoyl, N-phenylsulfamoyl, ureido, hydroxyl, carboxyl, sulfomethyl and sulfo. Possible substituents are in particular methyl, ethyl, methoxy, ethoxy, acetylamino, benzoylamino, amino, chlorine, bromine, ureido, hydroxyl, carboxyl, sulfomethyl or sulfo. Preferably the radical D contains one or more sulfo groups.

An alkyl radical $R_1$ can be straight-chain or branched; it can be further substituted, for example by halogen, hydroxy, cyano, $C_{1-4}$-alkoxy, carboxyl or sulfo. Examples of $R_1$ are the following radicals: methyl, ethyl, propyl, isopropyl, butyl, isobutyl, sec.-butyl, tert.-butyl, carboxymethyl, $\beta$-carboxyethyl, $\beta$-carboxypropyl, methoxycarbonylmethyl, ethoxycarbonylmethyl, $\beta$-methoxyethyl, $\beta$-ethoxyethyl, $\beta$-methoxypropyl, $\beta$-chloroethyl, $\gamma$-bromopropyl, $\beta$-hydroxyethyl, $\beta$-hydroxybutyl, $\beta$-cyanoethyl, sulfomethyl, $\beta$-sulfoethyl, aminosulfonylmethyl and $\beta$-sulfatoethyl. Preferably $R_1$ is hydrogen, methyl or ethyl.

Possible unsubstituted or substituted amino groups Z in the chloro-1,3,5-triazinyl radical are: $-NH_2$, alkylamino, N,N-dialkylamino, cycloalkylamino, N,N-dicycloalkylamino, aralkylamino, arylamino groups, mixed-substituted amino groups, such as N-alkyl-N-cyclohexylamino and N-alkyl-N-arylamino groups, further amino groups which contain heterocyclic radicals which can have further fused-on carbocyclic rings, and amino groups in which the amino nitrogen atom is member of an N heterocyclic ring which can contain further hetero atoms. The abovementioned alkyl radicals can be straight-chain or branched, low-molecular or higher-molecular, alkyl radicals having 1 to 6 carbon atoms being preferred; possible cycloalkyl, aralkyl and aryl radicals are in particular cyclohexyl, benzyl, phenethyl, phenyl and naphthyl radicals; heterocyclic radicals are in particular furan, thiophene, pyrazole, pyridine, pyrimidine, quinoline, benzimidazole, benzothiazole and benzoxazole radicals; and possible amino groups in which the amino nitrogen atom is member of a N-heterocyclic ring are preferably radicals of 6-membered N-heterocyclic compounds which can contain as further hetero atoms nitrogen, oxygen or sulfur. The abovementioned alkyl, cycloalkyl, aralkyl and aryl radicals, the heterocyclic radicals and the N-heterocyclic rings can be further substituted, for example by: halogen, such as fluorine, chlorine and bromine, nitro, cyano, trifluoromethyl, sulfamoyl, carbamoyl, $C_{1-4}$-alkyl, $C_{1-4}$-alkoxy, acylamino groups, such as acetylamino or benzoylamino, ureido, hydroxyl, carboxyl, sulfomethyl or sulfo. Examples of such amino groups are: —NH₂, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloroanilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3-or 4-carboxyphenylamino, 2-carboxy-5-sulfophenylamino, 2-carboxy-4-sulfophenylamino, 4-sulfonaphth-1-ylamino, 3,6-di-sulfonaphth-1-ylamino, 3,6,8-trisulfonaphth-1-ylamino, 4,6,8-trisulfonaphth-1-ylamino, 1-sulfonaphth-2-ylamino, 1,5-disulfonaphth-2-ylamino, 6-sulfonaphth-2-ylamino, morpholino, piperidino and piperazino.

The formula (1) part which is enclosed in square brackets is the reactive radical which can be present in the molecule once or twice; the two variants of the formula are equal in importance. When n is 2, the two reactive radicals can be identical or different; preferably the two radicals are identical. The formula (1) part which is enclosed in round brackets is likewise a reactive radical; it too can be present in the molecule once or twice. The reactive dyes of the formula (1) thus contain two types of reactive radicals. which can react in the manner of a nucleophilic substitution and in the manner of a nucleophilic addition.

Fiber-reactive compounds is to be understood as meaning those which are capable of reacting with the hydroxyl groups of cellulose, with the amino, carboxyl, hydroxyl and thiol groups of wool and silk or with the amino and possibly carboxyl groups of nylons to form covalent chemical bonds.

The reactive radicals, i.e. the vinyl or -sulfato-ethyl- etc. -sulfonyl radical and the chlorotriazinyl radical, are bonded to different or to identical radicals of starting components, i.e. diazo and coupling components. Preferably the reactive radicals are all bonded to one component, the diazo component or the coupling component. If two X—SO₂— reactive radicals are present, these are bonded in particular to the radical of the diazo component; and if the dye molecule contains two chlorotriazinyl radicals, these are preferably present in the coupling component. Thus, as indicated by the indices

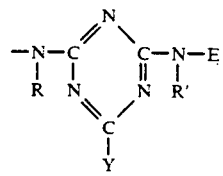

In these dyes, the X—SO₂ radical or the chlorotriazinylamino radical is bonded to E; E is a substituted or unsubstituted aliphatic or aromatic bridge member. The bridge member E is preferably an alkylene or arylene radical. For instance, E can be a long (for example having 10 or more carbon atoms) or shorter, straight-chain or branched alkylene radical; in particular an alkylene radical having 2 to 6 carbon atoms is possible, examples being ethylene, propylene, butylene, hexylene or cyclohexylene. An arylene radical E is for example a naphthylene radical, the radical of a diphenyl or of stilbene or in particular a phenylene radical. The radical E can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propyloxy and isopropyloxy, carboxyl or sulfo. R and R', independently of each other, are hydrogen or a substituted or unsubstituted $C_{1-4}$-alkyl radical; and Y is a halogen atom, a substituted or unsubstituted amino group, hydroxyl or an alkoxy, aryloxy, alkylthio or arylthio group.

Preferred formula variants of the reactive dyes of the formula (1) are:

a) reactive dyes of the formula

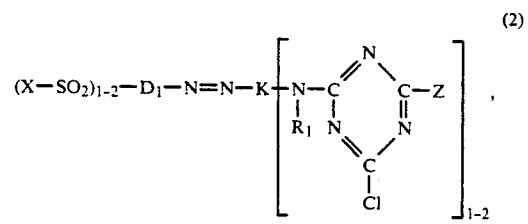

in which $D_1$ is the radical of a diazo component of the benzene or naphthalene series, and K is the radical of a coupling component of the benzene or naphthalene series or of the heterocyclic series, and $R_1$, Z and X are as defined under the formula (1).

b) reactive dyes as per a), of the formula

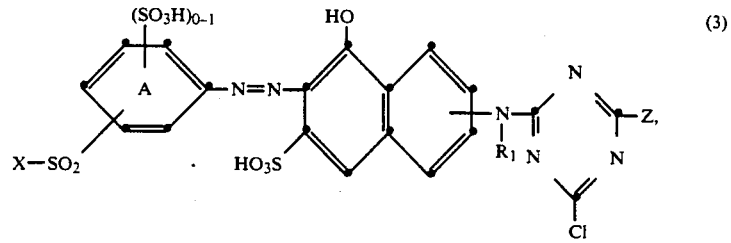

in which $R_1$, Z and X are as defined for a) and the benzene ring A can be further substituted.

which are attached to the reactive radicals in the formula (1), tri- and tetra-reactive dyes are also possible.

Likewise possible are reactive dyes of the formula (1) in which one of the reactive radicals or both are bonded to the chromophore via a radical of the formula c) reactive dyes as per a), of the formula (3)

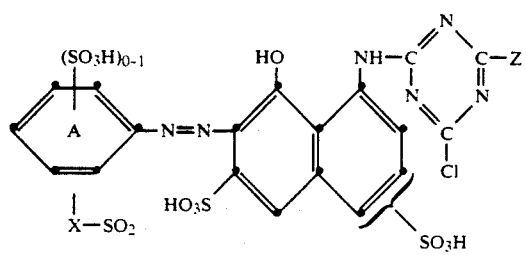

in which Z and X are as defined for a) and the benzene ring A can be further substituted.

d) reactive dyes as per a), of the formula

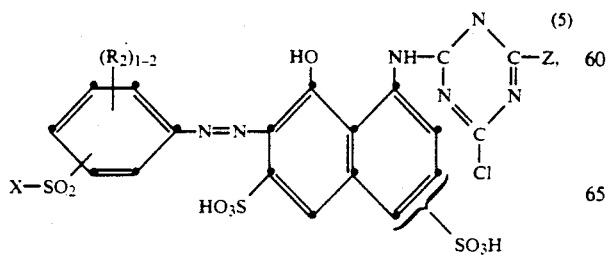

in which Z and X are as defined for a) and the benezene ring A can be further substituted.

h) reactive dyes as per a), of the formula in which Z and X are as defined for a), and $R_2$ is 1 or 2 substituents from the group consisting of $C_1$-4-alkyl, $C_1$-4-alkoxy, halogen, carboxyl and sulfo.

e) reactive dyes as per a), of the formula

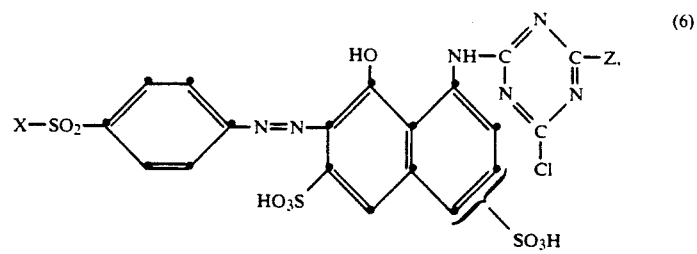

in which Z is an unsubstituted or substituted naphthylamino radical, an unsubstituted or substituted carboxyl- or sulfovoid phenylamino radical or an unsubstituted or substituted carboxyl- or sulfo-void N-alkylamino or N,N-dialkylamino radical, and X is as defined for a).

f) reactive dyes as per a), of the formula

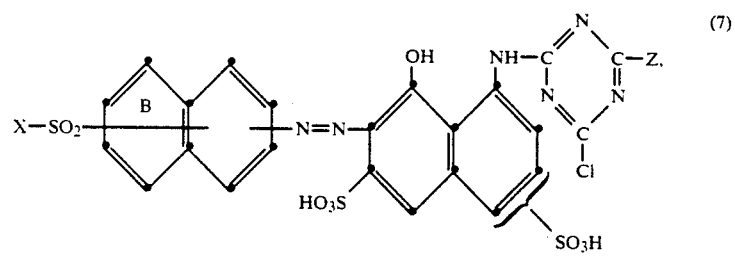

in which Z and X are as defined for a) and the naphthalene nucleus B can be further substituted.

g) reactive dyes as per a), of the formula

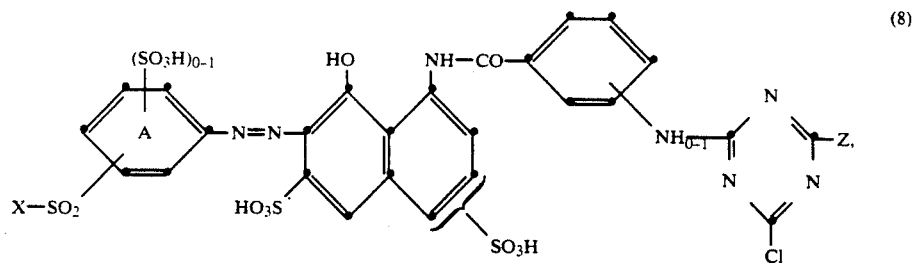

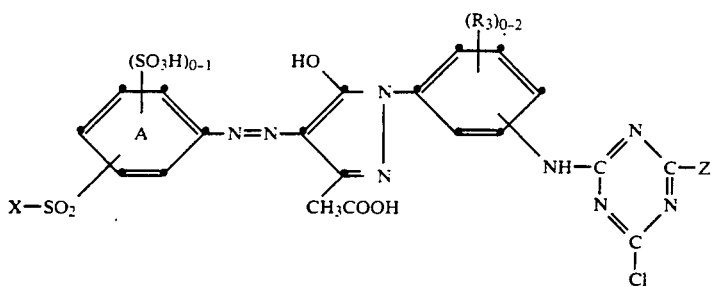

(9)

in which Z and X are as defined for a), $R_3$ is 0 to 2 substituents from the group consisting of $C_1$-4-alkyl, $C_1$-4-alkoxy, halogen, carboxyl and sulfo, and the benzene ring A can be further substituted.

i) reactive dyes as per b), c) or f) to h) in which the benzene rings A or naphthalene nuclei B are not further substituted.

j) reactive dyes as per formula (1) or a) to i) in which Z is $NH_2$, $N$-$C_1$-4-alkylamino or $N,N$-di-$C_1$-4alkylamino which can be substituted by hydroxyl, cyano, carboxyl, $C_1$-4-alkoxy or sulfo, $N$-$C_1$-4-alkyl-$N$-phenylamino which can be substituted in the alkyl by sulfo and in the phenyl by $C_1$-4-alkyl, or is cyclohexylamino, morpholino, phenylamino which can be substituted by $C_1$-4-alkyl, halogen, hydroxyl or sulfo, or sulfonaphthylamino, subject to appropriate restrictions for e) then k) reactive dyes as per a) to j) in which X is a vinyl or β-sulfatoethyl group.

Particular preference is given to reactive dyes of the formula (1) in which Z is a radical of the formula

(12)

in which $R_4$ and $R_5$, independently of each other, are hydrogen, $C_1$-4-alkyl which can be substituted by halogen, cyano, $C_1$-4-alkoxy, hydroxyl, carboxyl, sulfo or sulfato, benzyl, phenethyl, cyclohexyl, phenyl which can be substituted by halogen, nitro, cyano, trifluoromethyl, sulfamoyl, carbamoyl, $C_1$-4-alkyl, $C_1$-4-alkoxy, $C_1$-4-alkanoylamino, benzoylamino, ureido, hydroxyl, carboxyl, sulfomethyl or sulfo, or naphthyl which can be substituted by halogen, nitro, $C_1$-4-alkoxy, $C_1$-4-alkanoylamino, hydroxyl, carboxyl or sulfo, or in which $R_4$ and $R_5$, together with the amino nitrogen atom, are a morpholine, piperidino or piperazino radical, subject to the restriction indicated under the formula (1).

The process for preparing the reactive dyes of the formula (1) comprises reacting dyes of the formula

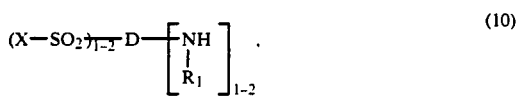

(10)

in which D, $R_1$ and X are as defined under the formula (1), or their precursors, with 2,4,6-trichloro-s-triazine and amines of the formula

H—Z    (11)

in which Z is as defined under the formula (1), to reactive dyes of the formula (1), or converting the resulting intermediates into the desired end dyes, and if desired following up with a further conversion reaction.

The procedure is thus to start from dyes which already contain an X—$SO_2$— group and to acylate the —$N(R_1)H$ group with 2,4,6-trichlorotriazine or aminodichlorotriazine; or to use corresponding precursors, for example a disazo component of the formula

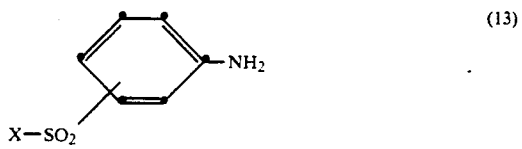

(13)

and couple this component onto a coupling component which contains an —$N(R_1)H$ group and to acylate the —$N(R_1)H$ group before or after the coupling with 2,4,6-trichlorotriazine or aminodichlorotriazine. In the embodiment described above, the acylatable —$N(R_1)H$ group can also be present in the diazo component, and correspondingly the X—$SO_2$— group in the coupling component. In this case the diazo components used are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. If desired, use is made of corresponding acylamino or nitro compounds in which the acetylamino and nitro groups are converted into $H_2N$— groups by hydrolysis and reduction respectively before the condensation with 2,4,6-trichlorotriazine or aminodichlorotriazine. The position of the reactive radicals in the completed azo dye is thus not invariably tied to certain starting components-diazo and coupling components.

Moreover, the two reactive radicals can also be bonded to one and the same component, for example by using a non-fiber-reactive diazo component and a coupling component of the formula

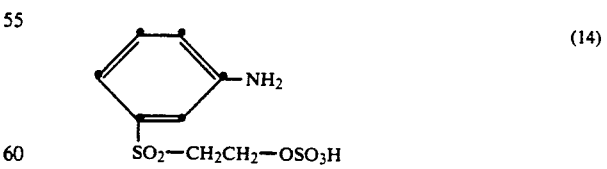

(14)

and acylating the —$NH_2$ group with 2,4,6-trichlorotriazine or aminodichlorotriazine after the coupling.

Another advantageous method comprises first preparing a dye which contains a precursor of the reactive radical and subsequently converting this precursor into the final stage, for example by esterification or an addition reaction. For example, it is possible to prepare a dye of the formula (10) in which X is a radical of the formula HO—CH₂CH₂— and to react the intermediate before or after the acylation with sulfuric acid, so that the hydroxyl group is converted into a sulfato group; or to use an analogous dye in which X is the vinyl group H₂C=CH— and to add thiosulfuric acid onto the intermediate, thereby forming an HO₃SS—CH₂CH₂— radical. The sulfation of the hydroxyl group in a dye of the formula (10) or a suitable precursor is effected for example by reaction with concentrated sulfuric acid at 0° C. to moderately elevated temperature. The sulfation can also be effected by reacting the hydroxy compound with two equivalents of chlorosulfonic acid per hydroxyl group in a polar organic solvent, for example N-methylpyrrolidone, at 10° to 80° C. Preferably the sulfation is effected by adding the compound in question to sulfuric acid monohydrate at temperatures between 5° and 15° C. The introduction of another radical detachable under alkaline conditions, for Z, in a compound of the formula (1) or an intermediate in place of the sulfato group, for example a thiosulfato group, is effected in a manner known per se.

It is also possible to follow the synthesis with elimination reactions. For example, it is possible to treat reactive dyes of the formula (1) which contain sulfatoethylsulfonyl radicals with acid-eliminating agents, such as sodium hydroxide, thereby converting the sulfatoethylsulfonyl radicals into vinylsulfonyl radicals.

The above-described preparative pathway via an intermediate of the reactive radical proceeds in many cases to a single compound and completion.

Since the individual abovementioned process steps can be carried out in various orders, various process variants are possible. In general, the reaction is carried out in successive steps, in which the order of the elementary reactions between the individual reaction components advantageously depends on the particular conditions. Since, under certain conditions, the 2,4-dichlorotriazinyl radical undergoes hydrolysis, it is necessary to hydrolyze an intermediate which contains acetylamino groups and hence to eliminate the acetyl groups before condensation with a 2,4,6-trichlorotriazine. Which part reaction is advantageously carried out first varies from case to case and depends in particular on the solubility of the amino compounds involved and on the basicity of the amino groups to be acylated. The acylation of the dyes of the formula (10) or of the dye precursors with 2,4,6-trichlorotriazine or aminodichlorotriazine is effected by methods known per se, preferably in aqueous solution or suspension and in the presence of alkaline acid-binding agents, for example aqueous alkali metal hydroxides, carbonates or bicarbonates.

The most important process variants are described in the illustrative embodiments.

There now follows a detailed list of possible starting materials which can be used for preparing the reactive dyes of the formula (1).

The dyes of the formula (10) can be in particular dyes of the following structural types:

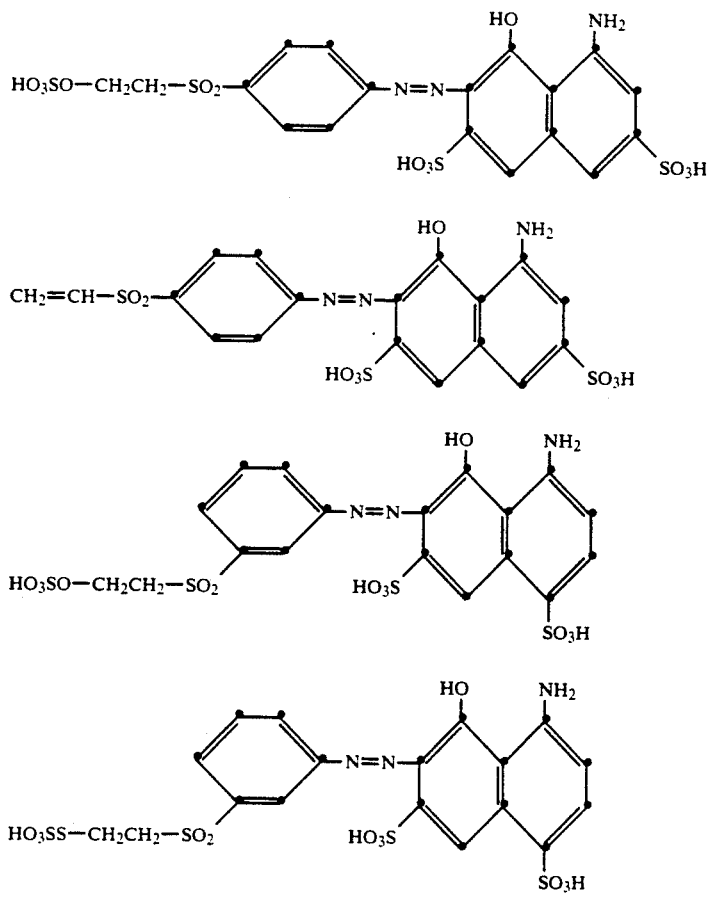

-continued
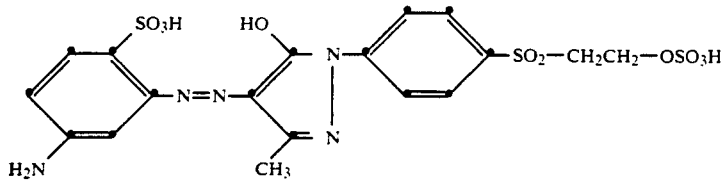
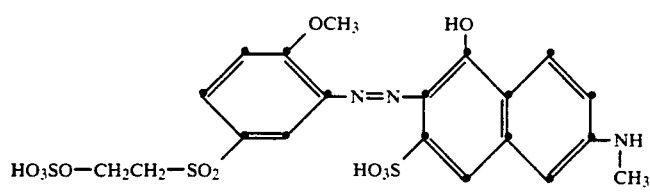
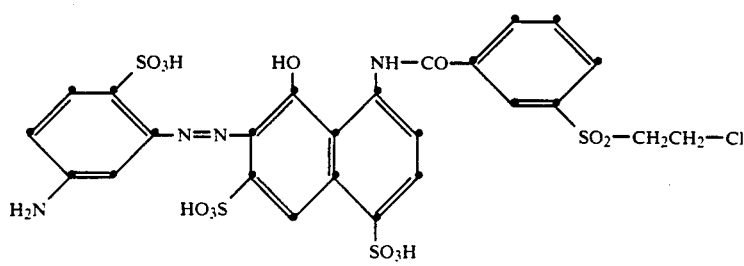
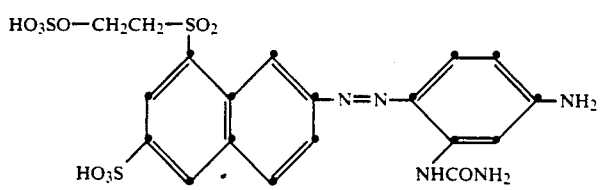
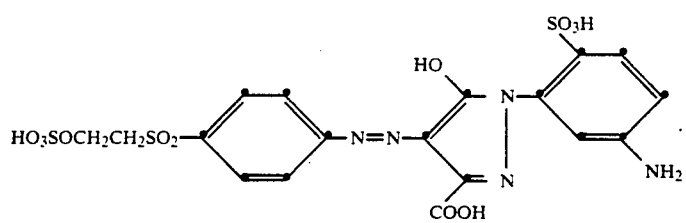
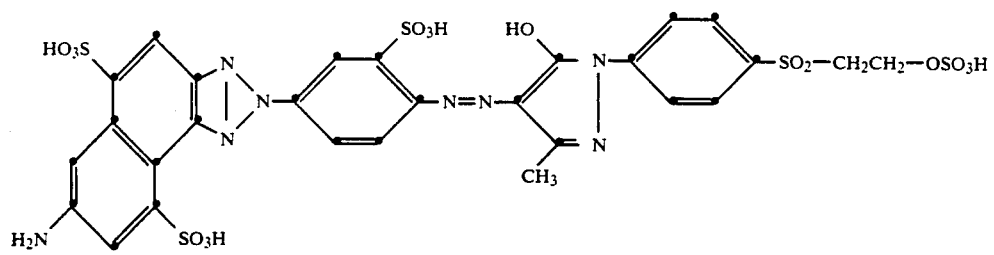
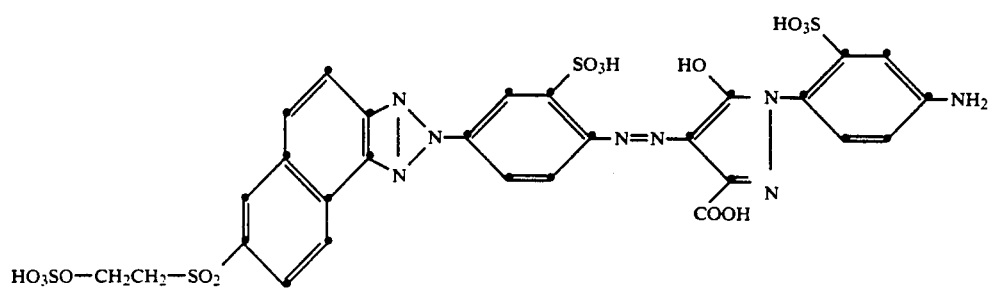
If the starting materials used for preparing the reactive dyes of the formula (1) are not completed amino dyes, are not for example those described above, but are dye precursors, i.e. the diazo and coupling components, it is necessary for one of the two components to have at least one acylatable amino group and the other to have at least one X—SO$_2$— group. Suitable diazo components are in the main compounds from the aminobenzene and aminonaphthalene series, for example those which are contained in the azo dyes of the above-mentioned formulae, such as 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene-1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid and 1,3,5-triaminobenzene.

Aromatic amines which can be used as diazo components for preparing the monoazo or disazo dyes and which contain one or two bonded groups of the formula X—SO$_2$— are for example:

1-amino-4-β-sulfatoethylsulfonylbenzene, 1-amino-4-β-thiosulfatoethylsulfonylbenzene, 1-amino-4-vinylsulfonylbenzene, 1-amino-4-β-chloroethylsulfonylbenzene, 1-amino-3-β-sulfatoethylsulfonylbenzene, 1-amino-3-vinylsulfonylbenzene, 1-amino-2-methoxy-5-β-sulfatoethylsulfonylbenzene, 1-amino-2-methoxy-5-β-thiosulfatoethylsulfonylbenzene, 1-amino-2-methoxy-5-vinylsulfonylbenzene, 1-amino-4-methoxy-3-β-sulfatoethylsulfonylbenzene, 1-amino-4-methoxy-3-β-vinylsulfonylbenzene, 1-amino-2,5-dimethoxy-4-β-sulfatoethylsulfonylbenzene, 1-amino-2,5-dimethoxy-4-vinylsulfonylbenzene, 1-amino-2-methoxy-4-β-sulfatoethylsulfonyl-5-methylbenzene, 1-amino-2-methoxy-4-vinylsulfonyl-5-methylbenzene, 1-amino-3-β-sulfatoethylsulfonyl-6-carboxybenzene, 1-amino-3-vinylsulfonyl-6-carboxybenzene, 1-amino-4-β-sulfatoethylsulfonylbenzene-2-sulfonic acid, 1-amino-4-vinylsulfonylbenzene-2-sulfonic acid, 1-amino-5-vinylsulfonylbenzene-2,4-disulfonic acid, 1-amino-2-hydroxy-5-β-sulfatoethylsulfonylbenzene, 1-amino-2-hydroxy-4-β-sulfatoethylsulfonylbenzene-1-amino-2-hydroxy-5-β-sulfatoethylsulfonylbenzene-3-sulfonic acid, 1-amino-2-bromo-4-β-sulfatoethylsulfonylbenzene, 1-amino-2,6-dichloro-4-β-sulfatoethylsulfonylbenzene, 1-amino-2,4-di-(β-sulfatoethylsulfonyl)-benzene, 1-amino-2,4-di-(β-sulfatoethylsulfonyl)-5-chlorobenzene, 1-amino-2,4-di-(β-thiosulfatoethylsulfonyl)-5-chlorobenzene, 1-amino-2,4-di(vinylsulfonyl)-benzene, 1-amino-2,4-di-(vinylsulfonyl)-5-chlorobenzene, 1-amino-2,4-di-(β-acetoxyethylsulfonyl)-benzene, 1-amino-2,4-di-(β-acetoxyethylsulfonyl)-5-chlorobenzene, 2-amino-8-β-sulfatoethylsulfonylnaphthalene, 2-amino-6-β-sulfatoethylsulfonylnaphthalene, 2-amino-6-β-sulfatoethylsulfonylnaphthalene-1-sulfonic acid, 2-amino-8-β-sulfatoethylsulfonylnaphthalene-6-sulfonic acid, 2-amino-8-β-sulfatoethylsulfonylnaphthalene-6-sulfonic acid and 2-amino-6,8-di-(β-sulfatoethylsulfonyl)-naphthalene.

A mention should also be given to corresponding β-hydroxy compounds which can be used as precursors, for example: 1-amino-4-β-hydroxyethylsulfonylbenzene, 1-amino-3-β-hydroxyethylsulfonylbenzene, 1-amino-2,4-di-(β-hydroxyethylsulfonyl)-benzene and 1-amino-2,4-di-(β-hydroxyethyl-sulfonyl)-5-chlorobenzene.

If the diazo component to be used is not a diamine but an aminoacetylamino compound from which the acetyl group is subsequently to be re-eliminated by hydrolysis, as mentioned above in the explanation of the process, the monoacetyl compounds of the abovementioned diazo components are possible, examples thereof being 1-acetylamino-3-aminobenzene-4-sulfonic acid and 1-acetylamino-4-aminobenzene-3-sulfonic acid.

The coupling components are in the main suitable compounds of the aminobenzene and naphthalene series, for example anilines, N-monosubstituted anilines, m-phenylenediamine derivatives, aminonaphthalenes, naphthols, aminonaphthalene-sulfonic acid, naphtholsulfonic acids or aminonaphtholsulfonic acids, and also pyrazolones, aminopyrazoles, aminopyridines, hydroxypyridines/pyridones, aminopyrimidines, hydroxypyrimidines, indoles, barbituric acid derivatives or acetoacetarylides. Specific examples are:

1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6-or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 2-amino-5-hydroxynaphthalene-7-sulfonic acid, 2-methyl- or 2-ethylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or 2-ethylamino-8-hydroxynaphthalene-6-sulfonic acid, 2-amino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-(4'-aminobenzoylamino)-8-hydroxynaphthalene-3,6-or -4,6-disulfonic acid, 2-(4'-amino-3'-sulfophenylamino)-5-hydroxynaphthalene-7-sulfonic acid, 1-amino-8-hydroxynaphthalene-4-sulfonic acid, 2,4,6-triamino-3- cyanopyridine, 1-β-aminoethyl-3-cyano-4-methyl-6-hydroxypyrid-2-one, 1-γ-aminopropyl-3-sulfomethyl-4-methyl-6-hydroxypyrid-2-one, 1,3-diaminobenzene, 1-amino-3-(N,N-di-β-hydroxyethylamino)-benzene, 1-amino-3-(N,N-di-β-sulfatoethylamino)benzene, 1-amino-3-(N,N-di-β-hydroxyethylamino)-4-methoxybenzene, 1-amino-3-(N,N-di-β-sulfatoethylamino)-4-methoxybenzene, 1-amino-3-sulfobenzylaminobenzene, 1-amino-3-sulfobenzylamino-4-chlorobenzene, 1-amino-3-(N,N-di-sulfo-benzylamino)-benzene, 1-(3'-aminophenyl)-3-methyl-5-pyrazolone and 1-(aminophenyl)-3-carboxy-5-pyrazolones which can be substituted in the phenyl nucleus by chlorine, methyl, methoxy, nitro or sulfo, such as 1-(2'-sulfo-4'-aminophenyl)-3-carboxypyrazol-5-one.

If one of the two components contains both reactive groups at the same time or if these are to be introduced into the component in question, as in the case of the coupling components of the formulae

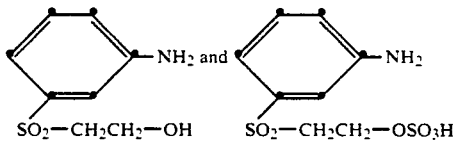

the other component, in this case the diazo component, can also be non-reactive, examples being: aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 2-aminodiphenyl ether, 1-aminobenzene-2-, -3- or -4-sulfonamide, 1-aminobenzene-2-, -3- or -4-carboxylic acid, dehydrothio-p-toluidine-sulfonic acid, 1-amino-3-trifluoromethylbenzene-6-sulfonic acid, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3-or -4-sulfonic acid, 1-amino-6-ethoxybenzene-3-or -4-sulfonic acid, 1-amino-2,4-dimethoxybenzene-6-sulfonic acid, 1-amino-2,5-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 2-aminonaphthalene-3,6-or 5,7-disulfonic acid, 1-aminonaphthalene-3,6- or -5.7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8-or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-6-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid.

The diazotization of intermediates containing a diazotizable amino group is generally effected by the action of nitrous acid in aqueous mineral acid solution at low temperature and the coupling at weakly acid, neutral or weakly alkaline pH.

The condensation of 2,4,6-trichlorotriazine or aminodichlorotrizine with the diazo components or coupling components or with acylatable monoazo or disazo intermediates or with amino-containing dyes of the formula (10) or their precursors are preferably effected in aqueous solution or suspension, at low temperature and at weakly acid, neutral or weakly alkaline pH. Advantageously the hydrogen chloride set free in the course of the condensation is continuously neutralized by addition of aqueous alkali metal hydroxides, carbonates or bicarbonates.

Further starting compounds:

2,4,6-Trichloro-s-triazine (cyanuric chloride)

Amines of the formula (11)

Ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, N-hydroxyethylaniline, 3- or 4-acetylaminoaniline, o-, m- and p-nitroaniline, o-, m- and p-aminophenol, 2-methyl-4-nitroaniline, 2-methyl-5-nitroaniline, 2,5-dimethoxyaniline, 3-methyl-4-nitroaniline, 2-nitro-4-methylaniline, 3-nitro-4-methylaniline, o-, m- and p-anisidine, o-, m- and p-phenetidine, naphth-1-ylamine, naphth-2-ylamine, 2-amino-1-hydroxynaphthalene, 1-amino-4-hydroxynaphthalene, 1-amino-8-hydroxynaphthalene, 1-amino-2-hydroxynaphthalene, 1-amino-7-hydroxynaphthalene, orthanilic acid, metanilic acid, sulfanilic acid, aniline-2,4-disulfonic acid, aniline-2,5-disulfonic acid, anthranilic acid, m- and p-aminobenzoic acid, 2-aminotoluene-4-sulfonic acid, 2-aminotoluene-5-sulfonic acid, paminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8-and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8-and -4,6,8-trisulfonic acid, 2-naphthylamine-1,3,7-, -1,5,7-, -3,5,7-, -3,6,7-, -3,6,8- and -4,6,8-trisulfonic acid, 2-, 3- and 4-aminopyridine, 2-aminobenzothiazole, 5-, 6- and 8-aminoquinoline, 2-aminopyrimidine, morpholine, piperidine and piperazine.

The condensations of 2,4,6-trichloro-s-triazine with the dyes of the formula (10) or coupling components or the amino compounds of the formula (11) are preferably effected in aqueous solution or suspension at low temperature and at weakly acid, neutral or weakly alkaline pH, so that at least one chlorine atom remains as a detachable radical in the completed reactive dye of the formula (1). Advantageously the hydrogen chloride set free in the course of the condensation is continuously neutralized by addition of aqueous alkali metal hydroxides, carbonates or bicarbonates.

The reactive dyes of the formula (1) are suitable for dyeing and printing a very wide variety of materials, such as silk, leather, wool, nylon fibers and polyurethanes, and in particular cellulose-containing fiber materials of any kind. These fiber materials are for example the natural cellulose fiber, such as cotton, linen and hemp, and wood pulp and regenerated cellulose. The reactive dyes of the formula (1) are also suitable for dyeing or printing hydroxyl-containing fibers which are contained in blend fabrics, for example blends of cotton with polyester fibers or nylon fibers.

The dyes according to the invention can be applied to the fiber material and be fixed on the fibre in various ways, in particular in the form of aqueous dye solutions and print pastes. They are suitable not only for the exhaust method of dyeing but also for dyeing by the pad dye method, whereby the cloth is impregnated with aqueous dye solutions which can, if desired, also contain salt, and the dyes are fixed after an alkali treatment or in the presence of alkali, if desired with heating. They are particularly suitable for the so-called cold pad-batch method, whereby the dye is applied together with the alkali on a pad-mangle and is then fixed by storing at room temperature for a plurality of hours.

After fixing, the dyeings and prints are thoroughly rinsed with cold and hot water, if desired in the presence of an agent which acts like a dispersant and promotes the diffusion of the unfixed portion.

The reactive dyes of the formula (1) are distinguished by high reactivity and good fixing properties. They can therefore be used in the exhaust dyeing method at low dyeing temperatures and only require short steaming times in the pad-steam method. The degrees of fixation are high, and the unfixed portions can be readily washed off, the difference between the degree of exhaustion and degree of fixation being remarkably small, i.e. the hydrolysis loss being very low. The reactive dyes of the formula (1) are also suitable for printing, especially on cotton, but also for printing nitrogen-containing fibers, for example wool, silk or wool-containing blend fabrics.

The dyeings and prints on cellulose fiber material prepared with the dyes according to the invention have a high tinctorial strength and a high fiber-dye bond stability not only in the acid but also in the alkaline range, as well as a good light fastness and very good wet fastness properties, such as wash, water, seawater, cross-dyeing and perspiration fastness properties, and a good pleating fastness, hot press fastness and rub fastness.

The following examples serve to illustrate the invention. The temperatures are given in degrees celsius, and parts and percentages are by weight unless otherwise stated. Parts by weight relate to parts by volume as the kilogram relates to the liter.

The preparation of the monoazo or disazo intermediates is not described in all cases in the illustrative embodiments below, but it is readily apparent from the general description.

EXAMPLE 1

The diazo solution, prepared under hydrochloric acid conditions, of 28.1 parts of 4-β-sulfatoethylsulfonylaniline is added at 0°–5° C. and pH 5-6 to a solution of 29.9 parts of 1-(2'-sulfo-5'-aminophenyl)-3-carboxy-5-pyrazolone, and the coupling proceeds. The yellow monoazo dye subsequently has added to it a suspension of 18.8 parts of cyanuric chloride and is acylated at pH 6. 10.7 parts of N-methylaniline are then added, and the second condensation is carried out at 20°–30° C. and pH 6.5. The resultant monochlorotriazine dye is isolated; it has the formula

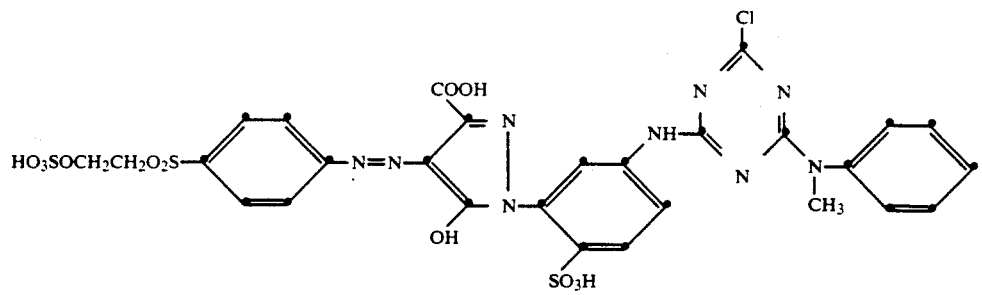

The method of Example 1 can be used to prepare further useful reactive dyes of the general formula (2), the symbols D1, K and Z which are listed in the table below being as defined under the formula (2) and $W_1$ being $-SO_2CH_2CH_2OSO_3H$, $W_2$ being $-SO_2CH_2CH_2SSO_3H$ and $W_3$ being $-SO_2CH=CH_2$. The last column of the table indicates the hue obtained on cotton with the dye in question.

| Example | D₁ | K | Z | Hue |
|---|---|---|---|---|
| 2 | W₁—⟨phenyl⟩— | —C(COOH)=N—N=C(OH)—⟨phenyl(NH—)(SO₃H)⟩ | —HNC₂H₄OH | yellow |
| 3 | W₁—⟨phenyl⟩— | —C(COOH)=N—N=C(OH)—⟨phenyl(NH—)(SO₃H)⟩ | —N⟨morpholino O⟩ | yellow |
| 4 | W₁—⟨phenyl⟩— | —C(COOH)=N—N=C(OH)—⟨phenyl(NH—)(SO₃H)⟩ | —HNCH₂CN | yellow |
| 5 | W₁—⟨phenyl⟩— | —C(COOH)=N—N=C(OH)—⟨phenyl(NH—)(SO₃H)⟩ | —N(CH₂CH₂CN)(CH₂CH₂CN) | yellow |
| 6 | W₁—⟨phenyl⟩— | —C(COOH)=N—N=C(OH)—⟨phenyl(NH—)(SO₃H)⟩ | —NH—CH₂COOH | yellow |
| 7 | W₁—⟨phenyl⟩— | —C(COOH)=N—N=C(OH)—⟨phenyl(NH—)(SO₃H)⟩ | —NH—⟨phenyl⟩—SO₃H | yellow |
| 8 | W₁—⟨phenyl⟩— | —C(COOH)=N—N=C(OH)—⟨phenyl(NH—)(SO₃H)⟩ | —N(C₂H₅)—⟨phenyl(CH₃)⟩ | yellow |

-continued

| Example | D₁ | K | Z | Hue |
|---|---|---|---|---|
| 9 | W₁–⟨phenyl⟩ | ⟨pyrazolone-COOH/HO/N=N-phenyl-NH-/SO₃H⟩ | –NH–⟨phenyl⟩ | yellow |
| 10 | W₁–⟨phenyl⟩ | ⟨pyrazolone-COOH/HO/N=N-phenyl-NH-/SO₃H⟩ | –NH–⟨phenyl-Cl⟩ | yellow |
| 11 | W₁–⟨phenyl⟩ | ⟨pyrazolone-COOH/HO/N=N-phenyl-NH-/SO₃H⟩ | –NH–⟨phenyl-OH⟩ | yellow |
| 12 | W₁–⟨phenyl⟩ | ⟨pyrazolone-COOH/HO/N=N-phenyl-NH-/SO₃H⟩ | –HNCH₂CH₂SO₃H | yellow |
| 13 | W₁–⟨phenyl⟩ | ⟨pyrazolone-COOH/HO/N=N-phenyl-NH-/SO₃H⟩ | –N(C₂H₅)–⟨phenyl⟩ | yellow |
| 14 | W₁–⟨phenyl⟩ | ⟨pyrazolone-COOH/HO/N=N-phenyl-NH-/SO₃H⟩ | –N(CH₃)–⟨phenyl-CH₃⟩ | yellow |
| 15 | W₁–⟨phenyl⟩ | ⟨pyrazolone-COOH/HO/N=N-phenyl-NH-/SO₃H⟩ | –N(C₂H₄OH)(C₂H₄OH) | yellow |

-continued

| Example | D₁ | K | Z | Hue |
|---|---|---|---|---|
| 16 | W₁–⟨phenyl⟩ | –C(COOH)=N–N=C(OH)–⟨phenyl(NH–)(SO₃H)⟩ | –NH–⟨naphthyl–SO₃H⟩ | yellow |
| 17 | W₁–⟨phenyl⟩ | –C(COOH)=N–N=C(OH)–⟨phenyl(NH–)(SO₃H)⟩ | –NH–⟨naphthyl(SO₃H)(SO₃H)⟩ | yellow |
| 18 | W₁–⟨phenyl⟩ | –C(COOH)=N–N=C(OH)–⟨phenyl(NH–)⟩ | –HNC₂H₄OH | yellow |
| 19 | W₁–⟨phenyl⟩ | –C(COOH)=N–N=C(OH)–⟨phenyl(NH–)⟩ | –N(morpholino)O | yellow |
| 20 | W₁–⟨phenyl⟩ | –C(COOH)=N–N=C(OH)–⟨phenyl(NH–)⟩ | –HNCH₂CN | yellow |
| 21 | W₁–⟨phenyl⟩ | –C(CH₃)=N–N=C(OH)–⟨phenyl(NH–)⟩ | –N(CH₂CH₂CN)(CH₂CH₂CN) | yellow |
| 22 | W₁–⟨phenyl⟩ | –C(CH₃)=N–N=C(OH)–⟨phenyl(NH–)⟩ | –NH–CH₂COOH | yellow |
| 23 | W₁–⟨phenyl⟩ | –C(CH₃)=N–N=C(OH)–⟨phenyl(NH–)⟩ | –NH–⟨phenyl–SO₃H⟩ | yellow |

-continued

| Example | D₁ | K | Z | Hue |
|---|---|---|---|---|
| 24 | W₁—⟨phenyl⟩ | pyrazolone with CH₃, N=N, HO, linked to —NH—⟨phenyl⟩ | —N(CH₃)—⟨phenyl⟩ | yellow |
| 25 | W₁—⟨phenyl⟩ | pyrazolone with CH₃, N=N, HO, linked to —NH—⟨phenyl⟩ | —NH—⟨phenyl⟩ | yellow |
| 26 | W₁—⟨phenyl⟩ | pyrazolone with CH₃, N=N, HO, linked to —NH—⟨phenyl⟩ | —NH—⟨phenyl-Cl⟩ | yellow |
| 27 | W₁—⟨phenyl⟩ | pyrazolone with CH₃, N=N, HO, linked to —NH—⟨phenyl⟩ | —NH—⟨phenyl-OH⟩ | yellow |
| 28 | W₁—⟨phenyl⟩ | pyrazolone with COOH, N=N, HO, linked to —NH—⟨phenyl⟩ | —HNCH₂CH₂SO₃H | yellow |
| 29 | W₁—⟨phenyl⟩ | pyrazolone with COOH, N=N, HO, linked to —NH—⟨phenyl⟩ | —N(C₂H₅)—⟨phenyl⟩ | yellow |
| 30 | W₁—⟨phenyl⟩ | pyrazolone with COOH, N=N, HO, linked to —NH—⟨phenyl⟩ | —N(CH₃)—⟨phenyl-CH₃⟩ | yellow |
| 31 | W₁—⟨phenyl⟩ | pyrazolone with COOH, N=N, HO, linked to —NH—⟨phenyl⟩ | —N(C₂H₄OH)(C₂H₄OH) | yellow |

-continued

| Example | D₁ | K | Z | Hue |
|---|---|---|---|---|
| 32 | W₁–⬡ | ⬡ with COOH, N=N, HO, N-phenyl-NH- | -NH-naphthyl-SO₃H | yellow |
| 33 | W₁–⬡ | ⬡ with COOH, N=N, HO, N-phenyl-NH- | -NH-naphthyl(SO₃H)(SO₃H) | yellow |
| 34 | W₂–⬡ | ⬡ with COOH, N=N, HO, N-(SO₃H-phenyl)-NH- | -HN-phenyl-SO₃H | yellow |
| 35 | W₃–⬡ | ⬡ with COOH, N=N, HO, N-(SO₃H-phenyl)-NH- | -HN-phenyl-SO₃H | yellow |
| 36 | W₁–⬡–Br | ⬡ with COOH, N=N, HO, N-(SO₃H-phenyl)-NH- | -HN-phenyl-SO₃H | yellow |
| 37 | W₁–⬡–SO₃H | ⬡ with COOH, N=N, HO, N-(SO₃H-phenyl)-NH- | —HNC₂H₄OH | yellow |
| 38 | W₁–⬡–SO₃H | ⬡ with COOH, N=N, HO, N-(SO₃H-phenyl)-NH- | -N(morpholino)O | yellow |

-continued

| Example | D₁ | K | Z | Hue |
|---|---|---|---|---|
| 39 | W₁-phenyl-SO₃H | COOH-C=N-N(OH)-pyrazolone-phenyl(SO₃H)-NH- | —NH—CH₂CN | yellow |
| 40 | W₁-phenyl-SO₃H | COOH-C=N-N(OH)-pyrazolone-phenyl(SO₃H)-NH- | —NH-phenyl | yellow |
| 41 | W₁-phenyl | COOH-C=N-N(OH)-pyrazolone-phenyl(SO₃H)-NH- | —HN-phenyl-SO₃H | yellow |
| 42 | W₂-phenyl(CH₃)(CH₃) | COOH-C=N-N(OH)-pyrazolone-phenyl(SO₃H)-NH- | —HN-phenyl-SO₃H | yellow |
| 43 | OCH₃-phenyl-W₁ | COOH-C=N-N(OH)-pyrazolone-phenyl(SO₃H)-NH- | —HN-phenyl-SO₃H | yellow |
| 44 | OCH₃-phenyl-CH₂-W₁ | COOH-C=N-N(OH)-pyrazolone-phenyl(SO₃H)-NH- | —HN-phenyl-SO₃H | yellow |
| 45 | W₁—H₂C-phenyl | COOH-C=N-N(OH)-pyrazolone-phenyl(SO₃H)-NH- | —HN-phenyl-SO₃H | yellow |

-continued

| Example | D₁ | K | Z | Hue |
|---|---|---|---|---|
| 46 | W₂-phenyl | COOH-C(=N-N=)-C(OH)- linked to phenyl-NH- | -HN-phenyl-SO₃H | yellow |
| 47 | W₃-phenyl | COOH-C(=N-N=)-C(OH)- linked to phenyl-NH- | -HN-phenyl-SO₃H | yellow |
| 48 | W'₁-phenyl-Br | COOH-C(=N-N=)-C(OH)- linked to phenyl-NH- | -HN-phenyl-SO₃H | yellow |
| 49 | W'₁-phenyl-SO₃H | COOH-C(=N-N=)-C(OH)- linked to phenyl-NH- | HNC₂H₄OH | yellow |
| 50 | W'₁-phenyl-SO₃H | COOH-C(=N-N=)-C(OH)- linked to phenyl-NH- | -N(morpholino)O | yellow |
| 51 | W'₁-phenyl-SO₃H | COOH-C(=N-N=)-C(OH)- linked to phenyl-NH- | -NH-CH₂CN | yellow |
| 52 | W'₁-phenyl-SO₃H | COOH-C(=N-N=)-C(OH)- linked to phenyl-NH- | -NH-phenyl | yellow |
| 53 | W'₁-phenyl(OCH₃)(CH₃) | COOH-C(=N-N=)-C(OH)- linked to phenyl-NH- | -HN-phenyl-SO₃H | yellow |

-continued

| Example | $D_1$ | K | Z | Hue |
|---|---|---|---|---|
| 54 | 2,4-disubstituted benzene with OCH$_3$, W$_2$, CH$_3$ | pyrazolone with COOH, bonded via N=N to phenyl-NH− with ring | −HN−C$_6$H$_3$(SO$_3$H) | yellow |
| 55 | benzene with OCH$_3$ and W$_1$ | pyrazolone with COOH | −HN−C$_6$H$_3$(SO$_3$H) | yellow |
| 56 | benzene with CH$_2$−W$_1$ | pyrazolone with COOH | −HN−C$_6$H$_3$(SO$_3$H) | yellow |
| 57 | W$_1$−H$_2$C−benzene | pyrazolone with COOH | −HN−C$_6$H$_3$(SO$_3$H) | yellow |
| 58 | benzene with W$_2$ | pyrazolone with CH$_3$ | −HN−C$_6$H$_3$(SO$_3$H) | yellow |
| 59 | benzene with W$_3$ | pyrazolone with CH$_3$ | −HN−C$_6$H$_3$(SO$_3$H) | yellow |
| 60 | benzene with Br and W$_1$ | pyrazolone with CH$_3$ | −HN−C$_6$H$_3$(SO$_3$H) | yellow |
| 61 | benzene with SO$_3$H and W$_1$ | pyrazolone with CH$_3$ | −HNC$_2$H$_4$OH | yellow |

-continued

| Example | D₁ | K | Z | Hue |
|---|---|---|---|---|
| 62 | 2-SO₃H, W₁-substituted phenyl | CH₃-C(=N-N=)-C(OH)=CH- linked to 3-aminophenyl (NH—) | morpholino (—N(CH₂CH₂)₂O) | yellow |
| 63 | 2-SO₃H, W₁-substituted phenyl | same as 62 | —NH—CH₂CN | yellow |
| 64 | 2-SO₃H, W₁-substituted phenyl | same as 62 | —NH—phenyl | yellow |
| 65 | 2-OCH₃, 5-CH₃, W₁-substituted phenyl | same as 62 | —HN—C₆H₄—SO₃H (4-sulfo) | yellow |
| 66 | 2-OCH₃, 5-CH₃, W₂-substituted phenyl | same as 62 | —HN—C₆H₄—SO₃H (4-sulfo) | yellow |
| 67 | 2-OCH₃, 5-W₁-substituted phenyl | same as 62 | —HN—C₆H₄—SO₃H (4-sulfo) | yellow |
| 68 | 2-OCH₃, 5-CH₂W₁-substituted phenyl | same as 62 | —HN—C₆H₄—SO₃H (4-sulfo) | yellow |
| 69 | 4-(W₁—H₂C)-phenyl | same as 62 | —HN—C₆H₄—SO₃H (4-sulfo) | yellow |

-continued

| Example | $D_1$ | K | Z | Hue |
|---|---|---|---|---|
| 70 | $W_2$—⟨phenyl⟩— | —C(COOH)=N—N=C(OH)—⟨phenyl⟩—NH— | —HN—⟨phenyl⟩—$SO_3H$ | yellow |
| 71 | $W_3$—⟨phenyl⟩— | —C(COOH)=N—N=C(OH)—⟨phenyl⟩—NH— | —HN—⟨phenyl⟩—$SO_3H$ | yellow |
| 72 | $W_1$—⟨phenyl, Br⟩— | —C(COOH)=N—N=C(OH)—⟨phenyl⟩—NH— | —HN—⟨phenyl⟩—$SO_3H$ | yellow |
| 73 | $W_1$—⟨phenyl, $SO_3H$⟩— | —C(COOH)=N—N=C(OH)—⟨phenyl⟩—NH— | $HNC_2H_4OH$ | yellow |
| 74 | $W_1$—⟨phenyl, $SO_3H$⟩— | —C(COOH)=N—N=C(OH)—⟨phenyl⟩—NH— | —N⟨morpholino⟩O | yellow |
| 75 | $W_1$—⟨phenyl, $SO_3H$⟩— | —C(COOH)=N—N=C(OH)—⟨phenyl⟩—NH— | —NH—$CH_2CN$ | yellow |
| 76 | $W_1$—⟨phenyl, $SO_3H$⟩— | —C(COOH)=N—N=C(OH)—⟨phenyl⟩—NH— | —NH—⟨phenyl⟩ | yellow |
| 77 | $W_1$—⟨phenyl, $OCH_3$, $CH_3$⟩— | —C(COOH)=N—N=C(OH)—⟨phenyl⟩—NH— | —HN—⟨phenyl⟩—$SO_3H$ | yellow |

-continued

| Example | D₁ | K | Z | Hue |
|---|---|---|---|---|
| 78 | 2-OCH₃, 5-CH₃, 4-W₂ phenyl | pyrazolone with COOH, HO, N=N, linked to phenyl-NH- | -HN-C₆H₄-SO₃H | yellow |
| 79 | 2-OCH₃, 5-W₁ phenyl | pyrazolone with COOH, HO, N=N, linked to phenyl-NH- | -HN-C₆H₄-SO₃H | yellow |
| 80 | 4-(CH₂-W₁) phenyl | pyrazolone with COOH, N=N, linked to phenyl-NH- | -HN-C₆H₄-SO₃H | yellow |
| 81 | W₁-H₂C-phenyl | pyrazolone with COOH, HO, N=N, linked to phenyl-NH- | -HN-C₆H₄-SO₃H | yellow |
| 82 | 4-(CH₂CH₂-W₁) phenyl | pyrazolone with COOH, OH, N=N, linked to phenyl(NH-)(SO₃H) | -HN-C₆H₄-SO₃H | yellow |
| 83 | W₁-H₂CH₂C-phenyl | pyrazolone with COOH, OH, N=N, linked to phenyl(NH-)(SO₃H) | -HN-C₆H₄-SO₃H | yellow |
| 84 | 2-SO₃H, 5-NH-CO-(CH₂)₃-SO₂-(CH₂)₂-Cl phenyl | pyrazolone with COOH, OH, N=N, linked to phenyl(NH-)(SO₃H) | -HN-C₆H₄-SO₃H | yellow |

-continued

| Example | D₁ | K | Z | Hue |
|---|---|---|---|---|
| 85 | 4-sulfo-phenyl with NHCO(CH₂)₃SO₂(CH₂)₂Cl substituent | pyrazolone: COOH, OH, N=N, N-(2-sulfophenyl), 5-NH- linkage | -HN-C₆H₄-SO₃H (para) | golden yellow |
| 86 | naphthyl, 1-SO₃H, 6-W₁ | pyrazolone: COOH, OH, N=N, N-(2-sulfophenyl), 5-NH- linkage | -HN-C₆H₄-SO₃H (para) | golden yellow |
| 87 | naphthyl, W₁ at 1-position, HO₃S at 6-position | pyrazolone: COOH, OH, N=N, N-(2-sulfophenyl), 5-NH- linkage | -HN-C₆H₄-SO₃H (para) | golden yellow |
| 88 | naphthyl, W₁ at 8-position | pyrazolone: COOH, OH, N=N, N-(2-sulfophenyl), 5-NH- linkage | -HN-C₆H₄-SO₃H (para) | golden yellow |
| 89 | phenyl-CH₂CH₂-W₁ | pyrazolone: CH₃, OH, N=N, N-(2-sulfophenyl), 5-NH- linkage | -HN-C₆H₄-SO₃H (para) | yellow |
| 90 | W₁-H₂CH₂C-phenyl- | pyrazolone: CH₃, OH, N=N, N-(2-sulfophenyl), 5-NH- linkage | -HN-C₆H₄-SO₃H (para) | yellow |

-continued

| Example | D₁ | K | Z | Hue |
|---|---|---|---|---|
| 91 | 4-[NHCO(CH₂)₃SO₂(CH₂)₂—Cl]-phenyl | pyrazolone (CH₃, OH) coupled to 3-aminophenyl-N= | —HN—C₆H₄—SO₃H (para) | yellow |
| 92 | 4-[NHCO(CH₂)₃SO₂(CH₂)₂—Cl]-phenyl | pyrazolone (CH₃, OH) coupled to 3-aminophenyl-N= | —HN—C₆H₄—SO₃H (para) | golden yellow |
| 93 | naphthyl (SO₃H, W₁) | pyrazolone (CH₃, OH) coupled to 3-aminophenyl-N= | —HN—C₆H₄—SO₃H (para) | golden yellow |
| 94 | naphthyl (W₁, HO₃S) | pyrazolone (CH₃, OH) coupled to 3-aminophenyl-N= | —HN—C₆H₄—SO₃H (para) | golden yellow |
| 95 | naphthyl (W₁) | pyrazolone (CH₃, OH) coupled to 3-aminophenyl-N= | —HN—C₆H₄—SO₃H (para) | golden yellow |
| 96 | phenyl-CH₂CH₂-W₁ | pyrazolone (COOH, OH) coupled to 3-aminophenyl-N= | —HN—C₆H₄—SO₃H (para) | yellow |

-continued

| Example | D₁ | K | Z | Hue |
|---|---|---|---|---|
| 97 | W₁—H₂CH₂C—[phenyl]— | [pyrazolone: COOH, N=N, OH, attached to phenyl-NH—] | —HN—[phenyl-SO₃H]— | yellow |
| 98 | [phenyl with SO₃H, NH—C(=O)—(CH₂)₃—SO₂—(CH₂)₂—Cl]— | [pyrazolone: COOH, N=N, OH, attached to phenyl-NH—] | —HN—[phenyl-SO₃H]— | yellow |
| 99 | [phenyl with SO₃H, NH—C(=O)—(CH₂)₃—SO₂—(CH₂)₂—Cl]— | [pyrazolone: COOH, N=N, OH, attached to phenyl-NH—] | —HN—[phenyl-SO₃H]— | golden yellow |
| 100 | [naphthyl with SO₃H and W₁]— | [pyrazolone: COOH, N=N, OH, attached to phenyl-NH—] | —HN—[phenyl-SO₃H]— | golden yellow |
| 101 | [naphthyl with W₁ and HO₃S]— | [pyrazolone: COOH, N=N, OH, attached to phenyl-NH—] | —HN—[phenyl-SO₃H]— | golden yellow |
| 102 | [naphthyl with W₁]— | [pyrazolone: COOH, N=N, OH, attached to phenyl-NH—] | —HN—[phenyl-SO₃H]— | golden yellow |

-continued

| Example | D₁ | K | Z | Hue |
|---|---|---|---|---|
| 103 | 4-(W₁-CH₂CH₂)-phenyl | 1-(4'-amino-phenylamino)-4-hydroxy-pyrazole-3-carboxylic acid azo coupler | 4-sulfo-phenylamino (−HN−C₆H₃(SO₃H)−) | yellow |
| 104 | 4-(W₁−H₂CH₂C)-phenyl | same as 103 | same as 103 | yellow |
| 105 | 2-SO₃H-4-[NH−C(=O)−(CH₂)₃−SO₂−(CH₂)₂−Cl]-phenyl | same as 103 | same as 103 | yellow |
| 106 | 3-SO₃H-4-methyl-[NH−C(=O)−(CH₂)₃−SO₂−(CH₂)₂−Cl]-phenyl | same as 103 | same as 103 | golden yellow |
| 107 | 1-SO₃H-6-W₁-naphthyl | same as 103 | same as 103 | golden yellow |
| 108 | 1-W₁-6-HO₃S-naphthyl | same as 103 | same as 103 | golden yellow |

| Example | D₁ | K | Z | Hue |
|---|---|---|---|---|
| 109 | naphthyl with W₁ | COOH-pyridone coupled to -NH-phenyl-NH- | -HN-phenyl-SO₃H | golden yellow |

EXAMPLE 110

195 parts of cyanuric chloride are dissolved in 800 parts by volume of acetone; this solution is added with thorough stirring to a mixture of 1300 parts of water and 1300 parts of crushed ice with 20 parts by volume of 2N hydrochloric acid. To this suspension thus obtained is added with stirring in the course of 50 to 60 minutes a solution at pH 6.9 to 7.2 of 239 parts of 2-amino-5-naphthol-7-sulfonic acid, 65 parts of sodium carbonate and 2000 parts of water. The reaction of the cyanuric chloride with the aminonaphthol is carried out at a temperature between 0° and 5° C. and at pH 3 to 5. Stirring is continued until free amine is no longer detectable in a diazotization test.

The coupling component solution thus prepared has added to it 281 parts of diazotized 4β-sulfatoethylsulfonylaniline. Stirring is continued for 2 hours during which the pH is raised to 6.5 to 7.0 by sprinkling in sodium carbonate a little at a time. Stirring is continued at this pH and at room temperature for a further hour. 173 parts of anilinem-sulfonic acid are then added, followed a little at a time by 110 parts of sodium carbonate in order to maintain the pH at 5.0 to 6.0. This reaction solution is heated to 50° C. and is maintained at this temperature with stirring for one hour. After the reaction solution has cooled down, the azo compound formed is precipitated by means of sodium chloride, is filtered off with suction and is dried at 60° C. under reduced pressure. The result obtained is a red electrolyte-containing powder which contains the sodium salt of the compound of the formula.

liquors in a conventional exhaustion or padding method deep orange dyeing on cotton fibers. The dyeings have very good wash and light fastness properties.

EXAMPLE 111

195 parts of cyanuric chloride are dissolved in 800 parts by volume of acetone; this solution is added with thorough stirring to a mixture of 1300 parts of water and 1300 parts of crushed ice with 20 parts by volume of 2N hydrochloric acid. To this suspension thus obtained is added with stirring in the course of 50 to 60 minutes a solution at pH 6.9 to 7.2 of 239 parts of 2-amino-8-naphthol-6-sulfonic acid, 65 parts of sodium carbonate and 2000 parts of water. The reaction of the cyanuric chloride with the aminonaphthol is carried out at a temperature between 0° and 5° C. and at pH 3 to 5. Stirring is continued until free amine is no longer detectable in a diazotization test.

The coupling component solution thus prepared has added to it 281 parts of diazotized 4-β-sulfatoethylsulfonylanitine. Stirring is continued for 2 hours during which the pH is raised to 6.5 to 7.0 by sprinkling in sodium carbonate a little at a time. Stirring is continued at this pH and at room temperature for a further hour. 173 parts of anilinem-sulfonic acid are then added, followed a little at a time by 110 parts of sodium carbonate in order to maintain the pH at 5.0 to 6.0. This reaction solution is heated to 50° C. and is maintained at this temperature with stirring for one hour. After the reaction solution has cooled down, the azo compound formed is precipitated by means of sodium chloride, is filtered off with suction and is dried at 60° C. under

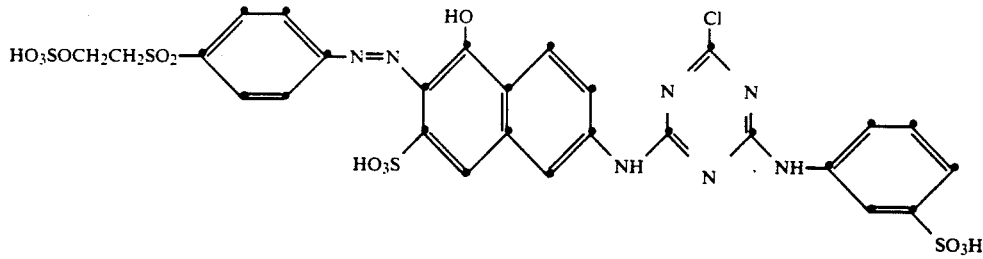

This azo compound is highly suitable for use as a dye. As a consequence of its fiber-reactive properties it produces for example on application from aqueous alkaline reduced pressure. The result obtained is a red electrolyte-containing powder which contains the sodium salt of the compound of formula I.

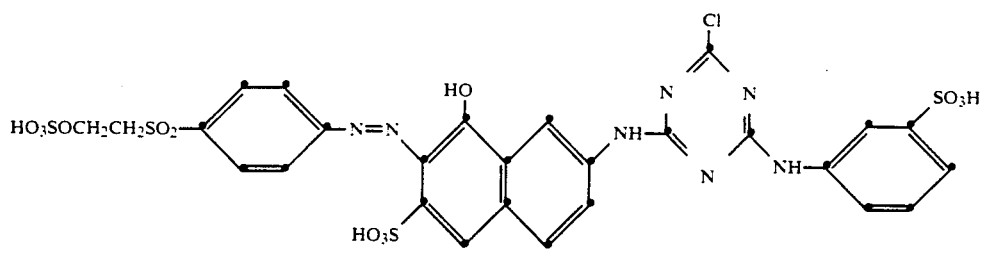

This azo compound is highly suitable for use as a dye. As a consequence of its fiber-reactive properties it produces for example on application from aqueous alkaline liquors in a conventional exhaustion or padding method deep scarlet dyeings on cotton fibers. The dyeings have very good wash and light fastness properties.

The methods described in Examples 110 and 111 can be used to prepare further useful reactive dyes of the general formula (2), the symbols $D_1$, K and Z which are listed in the table below being as defined under the formula (2) and $W_1$ being $-SO_2CH_2CH_2OSO_3H$, $W_2$ being $-SO_2CH_2CH_2SSO_3H$ and $W_3$ being $-SO_2-CH=CH_2$. The last column of the table indicates the hue obtained on cotton with the dye in question.

| Example | $D_1$ | K | Z | Hue |
|---|---|---|---|---|
| 112 | $W_1$–⌬ | HO-naphthyl(HO$_3$S)-NH– | –HNCH$_2$COOH | orange |
| 113 | $W_1$–⌬ | HO-naphthyl(HO$_3$S)-NH– | –NH$_2$ | orange |
| 114 | $W_1$–⌬ | HO-naphthyl(HO$_3$S)-NH– | –NH–CH$_3$ | orange |
| 115 | $W_1$–⌬ | HO-naphthyl(HO$_3$S)-NH– | –NH–⌬–H | orange |
| 116 | $W_1$–⌬ | HO-naphthyl(HO$_3$S)-NH– | –N(C$_2$H$_4$OH)$_2$ | orange |
| 117 | $W_1$–⌬ | HO-naphthyl(HO$_3$S)-NH– | –NH(CH$_2$)$_3$OCH$_3$ | orange |

-continued

| Example | D₁ | K | Z | Hue |
|---|---|---|---|---|
| 118 | W₁-C₆H₄- | 1-hydroxy-2-methyl-3-sulfo-6-amino-naphthalene | —NHCH₂CH₂OH | orange |
| 119 | W₁-C₆H₄- | 1-hydroxy-2-methyl-3-sulfo-6-amino-naphthalene | —NHCHCN | orange |
| 120 | W₁-C₆H₄- | 1-hydroxy-2-methyl-3-sulfo-6-amino-naphthalene | —N(CH₂CH₂CN)₂ | orange |
| 121 | W₁-C₆H₄- | 1-hydroxy-2-methyl-3-sulfo-6-amino-naphthalene | —NH—C₆H₄—SO₃H | orange |
| 122 | W₁-C₆H₄- | 1-hydroxy-2-methyl-3-sulfo-6-amino-naphthalene | —NH—C₆H₃(SO₃H)₂ | orange |
| 123 | W₁-C₆H₄- | 1-hydroxy-2-methyl-3-sulfo-6-amino-naphthalene | —NH-naphthyl-SO₃H | orange |
| 124 | W₁-C₆H₄- | 1-hydroxy-2-methyl-3-sulfo-6-amino-naphthalene | H₃S-naphthyl(SO₃H)-NH— | orange |
| 125 | W₁-C₆H₄- | 1-hydroxy-2-methyl-3-sulfo-6-amino-naphthalene | —NH—C₆H₄—OH | orange |

-continued

| Example | D₁ | K | Z | Hue |
|---|---|---|---|---|
| 126 | W₁—⟨phenyl⟩ | 1-hydroxy-2-methyl-7-HO₃S-6-amino-naphthalene | —NH—⟨phenyl⟩—CH₃ | orange |
| 127 | W₁—⟨phenyl⟩ | 1-hydroxy-2-methyl-7-HO₃S-6-amino-naphthalene | —N(CH₃)—⟨phenyl⟩ | orange |
| 128 | W₁—⟨phenyl⟩ | 1-hydroxy-2-methyl-7-HO₃S-6-amino-naphthalene | —N(C₂H₄)—⟨phenyl⟩ | orange |
| 129 | W₁—⟨phenyl⟩ | 1-hydroxy-2-methyl-7-HO₃S-6-amino-naphthalene | —N(CH₃)—⟨phenyl⟩ | orange |
| 130 | W₁—⟨phenyl⟩ | 1-hydroxy-2-methyl-7-HO₃S-6-amino-naphthalene | —N(CH₂SO₃H)—⟨phenyl⟩ | orange |
| 131 | W₁—⟨phenyl-SO₃H⟩ | 1-hydroxy-2-methyl-7-HO₃S-6-amino-naphthalene | —NH₂ | orange |
| 132 | W₁—⟨phenyl-SO₃H⟩ | 1-hydroxy-2-methyl-7-HO₃S-6-amino-naphthalene | —HN—C₂H₄OH | orange |
| 133 | W₁—⟨phenyl-SO₃H⟩ | 1-hydroxy-2-methyl-7-HO₃S-6-amino-naphthalene | —NH—CH₂CN | orange |

-continued

| Example | D₁ | K | Z | Hue |
|---|---|---|---|---|
| 134 | W₁–C₆H₃(SO₃H)– | 1-hydroxy-6-sulfo-2-methyl-7-amino-naphthalene | –N(CH₂CH₂CN)₂ | orange |
| 135 | W₁–C₆H₃(Br)– | 1-hydroxy-6-sulfo-2-methyl-7-amino-naphthalene | –NH–C₆H₄–SO₃H (meta) | orange |
| 136 | W₁–C₆H₃(Br)– | 1-hydroxy-6-sulfo-2-methyl-7-amino-naphthalene | –NH–C₆H₄–SO₃H (meta) | orange |
| 137 | W₁–C₆H₃(Br)– | 1-hydroxy-6-sulfo-2-methyl-7-amino-naphthalene | –NH–C₆H₄–SO₃H (para) | orange |
| 138 | W₂–C₆H₄– | 1-hydroxy-6-sulfo-2-methyl-7-amino-naphthalene | –HN–naphthyl(SO₃H)₂ | orange |
| 139 | W₃–C₆H₄– | 1-hydroxy-6-sulfo-2-methyl-7-amino-naphthalene | –NH–C₆H₃–SO₃H | orange |
| 140 | W₁-substituted 6-sulfo-naphthyl | 1-hydroxy-6-sulfo-7-amino-naphthalene | –NH–C₆H₄–SO₃H | scarlet |
| 141 | W₁,HO₃S-substituted naphthyl | 1-hydroxy-6-sulfo-7-amino-naphthalene | –NH–C₆H₄–SO₃H | orange-scarlet |

-continued
| Example | $D_1$ | K | Z | Hue |
|---|---|---|---|---|
| 142 | 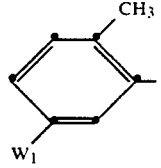 | 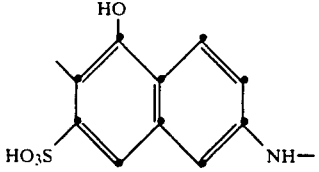 | 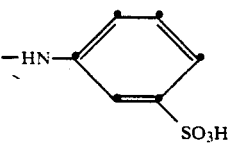 | scarlet |
| 143 | 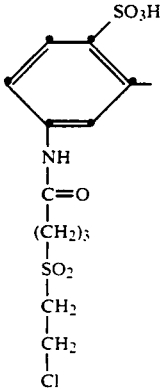 | 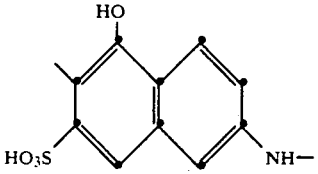 | 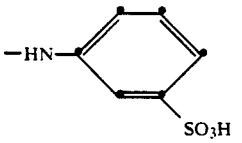 | orange |
| 144 | 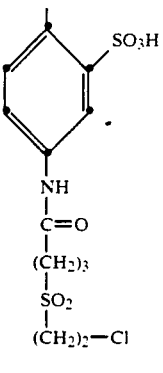 | 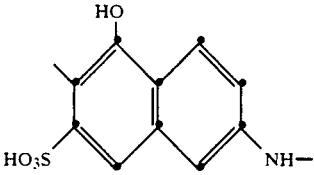 | 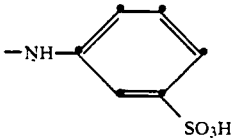 | orange |
| 145 | 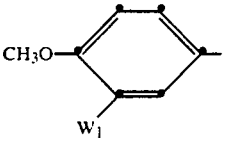 | 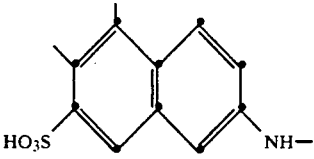 | 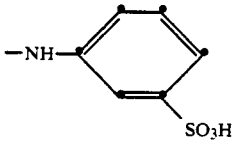 | scarlet |
| 146 | 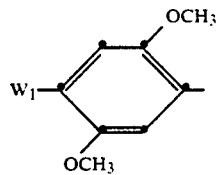 | 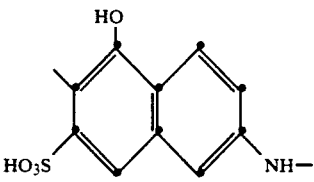 | 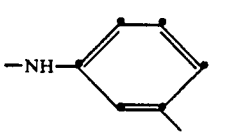 | red |
| 147 | 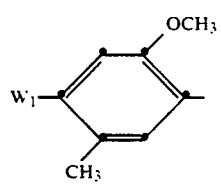 | 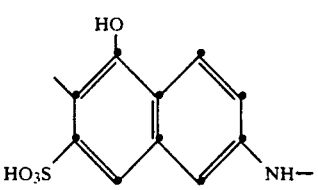 | 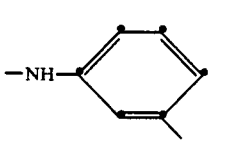 | red |

-continued
| Example | D₁ | K | Z | Hue |
|---|---|---|---|---|
| 148 | 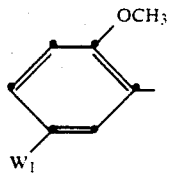 | 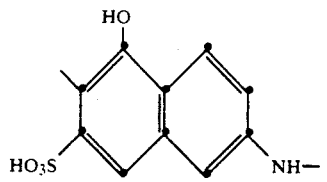 | 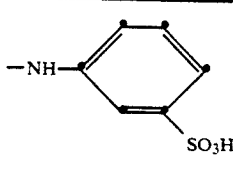 | scarlet |
| 149 | 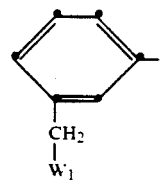 | 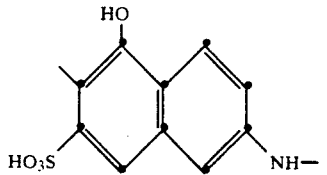 | 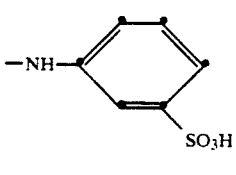 | orange |
| 150 | 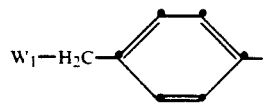 | 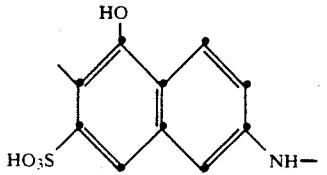 | 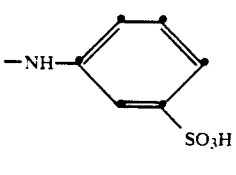 | orange-scarlet |
| 151 | 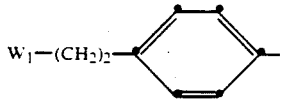 | 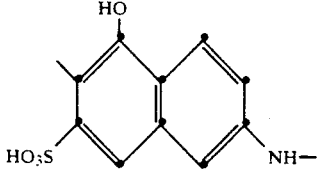 | 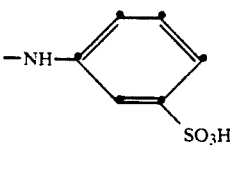 | orange-scarlet |
| 152 | 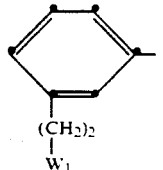 | 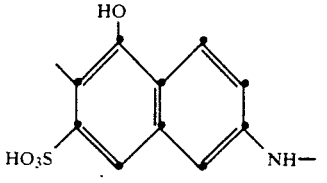 | 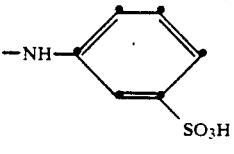 | orange |
| 153 | 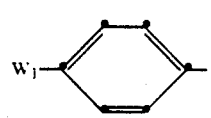 | 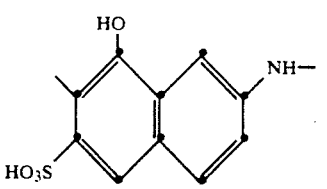 | —HNCH₂COOH | scarlet |
| 154 | 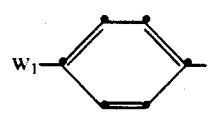 | 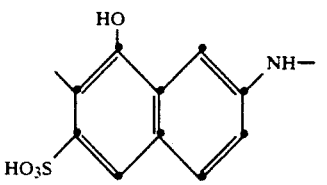 | —NH₂ | scarlet |
| 155 | 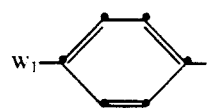 | 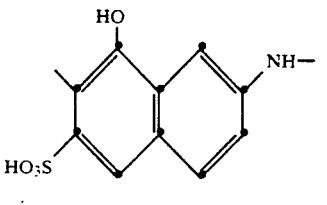 | —NH—CH₃ | scarlet |

-continued

| Example | D₁ | K | Z | Hue |
|---|---|---|---|---|
| 156 | W₁–⟨phenyl⟩– | 1-hydroxy-2-methyl-6-sulfo-7-amino-naphthalene | –NH–⟨phenyl-H⟩ | scarlet |
| 157 | W₁–⟨phenyl⟩– | 1-hydroxy-2-methyl-6-sulfo-7-amino-naphthalene | –N(C₂H₄OH)₂ | scarlet |
| 158 | W₁–⟨phenyl⟩– | 1-hydroxy-2-methyl-6-sulfo-7-amino-naphthalene | –NH(CH₂)₃OCH₃ | scarlet |
| 159 | W₁–⟨phenyl⟩– | 1-hydroxy-2-methyl-6-sulfo-7-amino-naphthalene | –NHCH₂CH₂OH | scarlet |
| 160 | W₁–⟨phenyl⟩– | 1-hydroxy-2-methyl-6-sulfo-7-amino-naphthalene | –NHCH₂CN | scarlet |
| 161 | W₁–⟨phenyl⟩– | 1-hydroxy-2-methyl-6-sulfo-7-amino-naphthalene | –N(CH₂CH₂CN)₂ | scarlet |
| 162 | W₁–⟨phenyl⟩– | 1-hydroxy-2-methyl-6-sulfo-7-amino-naphthalene | –NH–⟨phenyl⟩–SO₃H | scarlet |
| 163 | W₁–⟨phenyl⟩– | 1-hydroxy-6-sulfo-7-amino-naphthalene | –NH–⟨phenyl(HO₃S)(SO₃H)⟩ | scarlet |

-continued

| Example | D₁ | K | Z | Hue |
|---|---|---|---|---|
| 164 | W₁-[benzene] | 1-hydroxy-2-methyl-6-sulfo-7-amino-naphthalene | -NH-[naphthalene]-SO₃H | scarlet |
| 165 | W₁-[benzene] | 1-hydroxy-2-methyl-6-sulfo-7-amino-naphthalene | H₃S-[naphthalene]-SO₃H with -NH- | scarlet |
| 166 | W₁-[benzene] | 1-hydroxy-2-methyl-6-sulfo-7-amino-naphthalene | -NH-[benzene]-OH | scarlet |
| 167 | W₁-[benzene] | 1-hydroxy-2-methyl-6-sulfo-7-amino-naphthalene | -NH-[benzene]-CH₃ | scarlet |
| 168 | W₁-[benzene] | 1-hydroxy-2-methyl-6-sulfo-7-amino-naphthalene | -N(CH₃)-[benzene] | scarlet |
| 169 | W₁-[benzene] | 1-hydroxy-2-methyl-6-sulfo-7-amino-naphthalene | -N(C₂H₄)-[benzene] | scarlet |
| 170 | W₁-[benzene] | 1-hydroxy-2-methyl-6-sulfo-7-amino-naphthalene | -N(CH₃)-[benzene]-CH₃ | scarlet |
| 171 | W₁-[benzene] | 1-hydroxy-2-methyl-6-sulfo-7-amino-naphthalene | -N(CH₂SO₃H)-[benzene] | scarlet |

| Example | D₁ | K | Z | Hue |
|---|---|---|---|---|
| 172 | 4-methyl-2-sulfo-phenyl with NHC(=O)(CH₂)₃SO₂(CH₂)₂Cl substituent | 1-hydroxy-2-methyl-6-sulfo-7-amino-naphthalene (attached at 7-NH) | 4-sulfo-phenyl-NH- | red |
| 173 | 4-methoxy-phenyl with W₁ | 1-hydroxy-2-methyl-6-sulfo-7-amino-naphthalene | 4-sulfo-phenyl-NH- | red |
| 174 | 2,5-dimethoxy-phenyl with W₁ | 1-hydroxy-2-methyl-6-sulfo-7-amino-naphthalene | 4-sulfo-phenyl-NH- | red |
| 175 | 2-methoxy-5-methyl-phenyl with W₁ | 1-hydroxy-2-methyl-6-sulfo-7-amino-naphthalene | 4-sulfo-phenyl-NH- | red |
| 176 | 2-methoxy-phenyl with W₁ | 1-hydroxy-2-methyl-6-sulfo-7-amino-naphthalene | 4-sulfo-phenyl-NH- | red |
| 177 | phenyl-CH₂-W₁ (benzyl) | 1-hydroxy-2-methyl-6-sulfo-7-amino-naphthalene | 4-sulfo-phenyl-NH- | scarlet |
| 178 | W₁-H₂C-phenyl | 1-hydroxy-2-methyl-6-sulfo-7-amino-naphthalene | 4-sulfo-phenyl-NH- | red |

-continued

| Example | D₁ | K | Z | Hue |
|---|---|---|---|---|
| 179 | W₁—(CH₂)₂—C₆H₄— | 1-hydroxy-2-methyl-6-sulfo-7-amino-naphthalene | —HN—C₆H₄—SO₃H | scarlet |
| 180 | C₆H₄—(CH₂)₂—W₁ | 1-hydroxy-2-methyl-6-sulfo-7-amino-naphthalene | —HN—C₆H₅ | scarlet |
| 181 | W₁—C₆H₃(SO₃H)— | 1-hydroxy-2-methyl-6-sulfo-7-amino-naphthalene | —NH₂ | orange-scarlet |
| 182 | W₁—C₆H₃(SO₃H)— | 1-hydroxy-2-methyl-6-sulfo-7-amino-naphthalene | —HN—C₂H₄OH | orange-scarlet |
| 183 | W₁—C₆H₃(SO₃H)— | 1-hydroxy-2-methyl-6-sulfo-7-amino-naphthalene | —NH—CH₂CN | orange-scarlet |
| 184 | W₁—C₆H₃(SO₃H)— | 1-hydroxy-2-methyl-6-sulfo-7-amino-naphthalene | —N(CH₂CH₂CN)₂ | orange-scarlet |
| 185 | W₁—C₆H₃(Br)— | 1-hydroxy-2-methyl-6-sulfo-7-amino-naphthalene | —NH—C₆H₄—SO₃H | orange-scarlet |
| 186 | W₁—C₆H₃(Br)— | 1-hydroxy-2-methyl-6-sulfo-7-amino-naphthalene | —NH—C₆H₄—SO₃H | orange-scarlet |

| Example | D₁ | K | Z | Hue |
|---|---|---|---|---|
| 187 | W₁—C₆H₃(Br)— | 1-hydroxy-6-amino-3-sulfo-2-methylnaphthalene (linked via NH) | 4-sulfoanilino (HN—C₆H₄—SO₃H) | orange-scarlet |
| 188 | W₂—C₆H₄— | 1-hydroxy-6-amino-3-sulfo-2-methylnaphthalene | 6-amino-naphthalene-2,8-disulfonic acid | orange-scarlet |
| 189 | W'₃—C₆H₄— | 1-hydroxy-6-amino-3-sulfo-2-methylnaphthalene | 4-sulfoanilino | orange-scarlet |
| 190 | 1-W₁-naphthalene-5-sulfo | 1-hydroxy-6-amino-3-sulfo-2-methylnaphthalene | 4-sulfoanilino | red |
| 191 | W₁-naphthalene-SO₃H | 1-hydroxy-6-amino-3-sulfo-2-methylnaphthalene | 4-sulfoanilino | red |
| 192 | CH₃/W₁-substituted benzene | 1-hydroxy-6-amino-3-sulfo-2-methylnaphthalene | 4-sulfoanilino | scarlet |
| 193 | SO₃H-benzene with NH—CO—(CH₂)₃—SO₂—CH₂—CH₂—Cl | 1-hydroxy-6-amino-3-sulfo-2-methylnaphthalene | 4-sulfoanilino | scarlet |

EXAMPLE 194

281 parts of 4-β-sulfatoethylsulfonylaniline are added to 1000 parts of water and are dissolved by careful addition of 65 parts of sodium carbonate, the solution having a pH of 6.5 to 7.0. Stirring is continued at this pH for 2 hours, after which 750 parts of ice and 255 parts of 31% aqueous hydrochloric acid are added; afterwards 173 parts of 40% aqueous sodium nitrite solution are added, stirring is continued at 0° to 5° C. for a further 2 hours, and excess nitrous acid is then destroyed by means of sulfamic acid. The diazonium salt suspension thus prepared has added to it at pH 6.0 to 6.5 simultaneously with the addition of about 70 parts of sodium carbonate a solution of the secondary condensation product of one mole each of cyanuric chloride and 1-amino-8-naphthol-3,6-disulfonic acid and N-methylaniline. This solution of the secondary condensation product is prepared as follows: 319 parts of 1-amino-8-naphthol-3,6-disulfonic acid are added with stirring to a mixture of 500 parts of water and 121 parts of 33% sodium hydroxide solution; the pH of the solution should subsequently be 6.5 to 7.0. This solution is added at pH 3.0 to 3.8 in the course of one hour to a suspension of 194 parts of cyanuric chloride, 800 parts of water and 800 parts of ice. Stirring is continued for a further hour at 0° to 5° C. and at the indicated pH, which is maintained by sprinkling in 92 parts of sodium bicarbonate. To the clear solution thus obtained are added 107 parts of N-methylaniline and thereafter in the course of an hour 115 parts of sodium carbonate, the pH rising to 6.5 to 7.0. Stirring is continued at this pH for 2 hours during which the temperature is maintained at 15° to 20° C.

After the diazonium suspension and the solution of the coupling component have been combined, the coupling mixture is stirred at room temperature for a further 2 hours, during which a pH of 6.0 to 6.5 is maintained by sprinkling in 70 parts of sodium carbonate a little at a time. After the coupling has ended, the temperature is raised to 50° C., 40 parts of kieselguhr are added, the solution is clarified (filtered), the filtrate may have added to its 50 parts of disodium phosphate and is spray-dried.

The result obtained is a red electrolyte-containing powder which may contain the buffer substance mentioned and which contains an alkali metal salt, in particular the sodium salt, of the compound of the formula

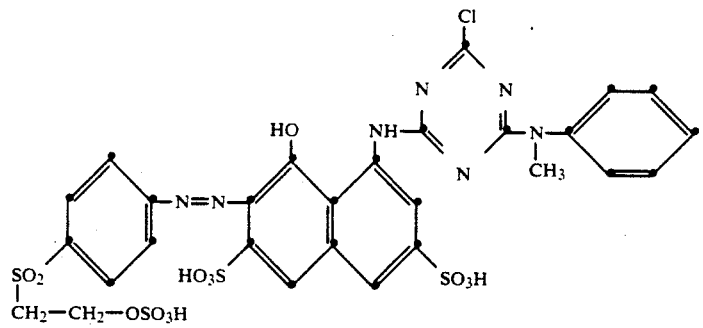

This compound has very good dye properties; applied by the application and fixing methods customary in the industry for fiber-reactive dyes, it dyes the materials mentioned in the description, in particular wool from an acid bath or cellulose fiber materials in the presence of acid-binding agents, in bright red shades having very good color buildup and a high degree of fixation. The dyeings have very good wet fastness properties, for example an excellent wash fastness.

EXAMPLE 195

A neutral aqueous solution having a pH of 6.5 is prepared from 297 parts of 4-$\beta$-thiosulfatoethylsulfonylaniline in 1000 parts of water. About 600 parts of ice are then added, followed gradually with stirring by about 200 parts of concentrated aqueous hydrochloric acid until a pH of 2 is reached. 173 parts of aqueous 40% sodium nitrite solution are then added at a temperature of 0° to 5° C., the mixture is stirred for one hour and excess nitrous acid is destroyed by means of sulfamic acid. This diazonium salt suspension obtained is coupled with an aqueous solution of the secondary condensation product of one mole each of cyanuric chloride and 1-amino-8-naphthol-3,6-disulfonic acid and aminoacetonitrile, in the manner described in Example 1. After completion of the coupling reaction, clarification and isolation of the dye, for example by spray-drying or salting out with sodium chloride, the result obtained is a red electrolyte-containing powder containing the corresponding alkali metal salt of the compound of the formula

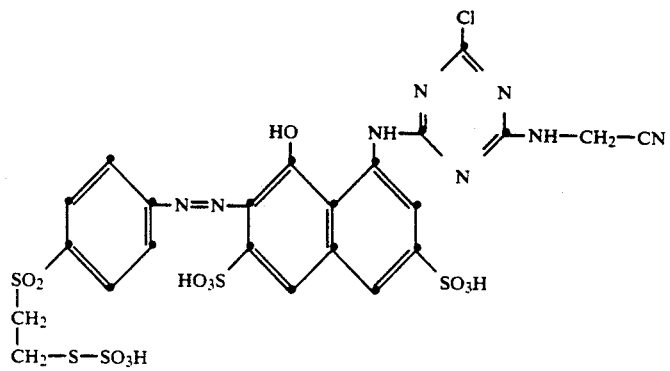

This compound likewise has very good dye properties and applied by the conventional dyeing and fixing methods for dyes which have a fiber-reactive group, in particular a β-thiosulfatoethylsulfonyl group, dyes polyamide fiber materials, in particular wool, and cellulose fiber materials in bright red shades having very good fastness properties, as mentioned for example for the dye of Example 1.

EXAMPLE 196

281 parts of 4-β-sulfatoethylsulfonylaniline are added to 1000 parts of water and are dissolved by careful addition of 65 parts of sodium carbonate, the solution having a pH of 6.5 to 7.0. Stirring is continued at this pH for 2 hours, after which 750 parts of ice and 255 parts of 31% aqueous hydrochloric acid are added; afterwards 173 parts of 40% aqueous sodium nitrite solution are added, stirring is continued at 0° to 5° C. for a further 2 hours, and excess nitrous acid is then destroyed by means of sulfamic acid. The diazonium salt suspension thus prepared has added to it at pH 6.0 to 6.5 simultaneously with the addition of about 70 parts of sodium carbonate a solution of the secondary condensation product of one mole each of cyanuric chloride and 1-amino-8-naphthol-3,6-disulfonic acid and dicyanoethylamine. This solution of the secondary condensation product is prepared as follows: 319 parts of 1-amino-8-naphthol-3,6-disulfonic acid are added with stirring to a mixture of 500 parts of water and 121 parts of 33% sodium hydroxide solution; the pH of the solution should subsequently be 6.5 to 7.0. This solution is added at pH 3.0 to 3.8 in the course of one hour to a suspension of 194 parts of cyanuric chloride, 800 parts of water and 800 parts of ice. Stirring is continued for a further hour at 0° to 5° C. and at the indicated pH, which is maintained by sprinkling in 92 parts of sodium bicarbonate. To the clear solution thus obtained are added 133 parts of dicyanoethylamine and thereafter in the course of an hour 115 parts of sodium carbonate, the pH rising to 6.5 to 7.0. Stirring is continued at this pH for 2 hours during which the temperature is maintained at 15° to 20° C.

After the diazonium suspension and the solution of the coupling component have been combined, the coupling mixture is stirred at room temperature for a further 2 hours, during which a pH of 6.0 to 6.5 is maintained by sprinkling in 70 parts of sodium carbonate a little at a time. After the coupling has ended, the solution is heated to 50° C. 40 parts of kicselguhr are added the solution is clarified (filtered), the filtrate may have added to it 50 parts of disodium phosphate and is spray-dried.

The result obtained is a red electrolyte-containing powder which may contain the buffer substance mentioned and which contains an alkali metal salt, in particular the sodium salt, of the compound of the formula

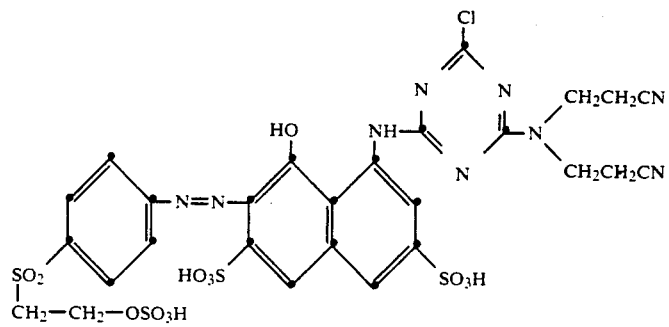

This compound has very good dye properties; applied by the application and fixing methods customary in the industry for fiber-reactive dyes, it dyes the materials mentioned in the description, in particular wool from an acid bath or cellulose fiber materials in the presence of acid-binding agents, in bright red shades having very good color buildup and a high degree of fixation. The dyeings have very good wet fastness properties, for example an excellent wash fastness.

EXAMPLE 197

A neutral aqueous solution having a pH of 6.5 is prepared from 297 parts of 4-β-thiosulfatoethylsulfonylaniline in 1000 parts of water. About 600 parts of ice are then added, followed gradually with stirring by about 200 parts of concentrated aqueous hydrochloric acid until a pH of 2 is reached. 173 parts of aqueous 40% sodium nitrite solution are then added at a temperature of 0° to 5° C., the mixture is stirred for one hour and excess nitrous acid is destroyed by means of sulfamic acid. This diazonium salt suspension obtained is coupled with an aqueous solution of the secondary condensation product of one mole each of cyanuric chloride and 1-amino-8-naphthol-3,6-disulfonic acid and N-methyl-O-toluolidine (sic), in the manner described in Example 1. After completion of the coupling reaction, clarification and isolation of the dye, for example by spray-drying or salting out with sodium chloride, the result obtained is a red electrolyte-containing powder containing the corresponding alkali metal salt of the compound of the formula

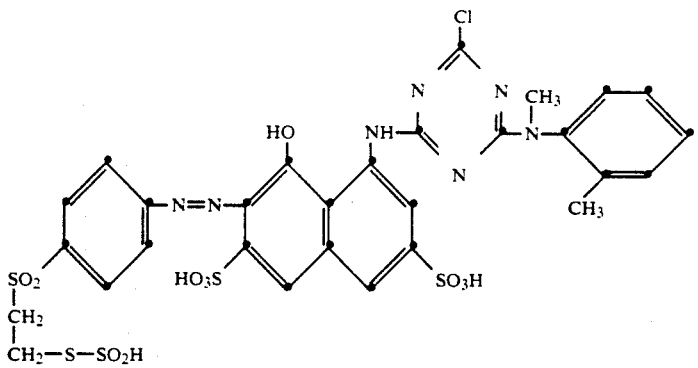

This compound likewise has very good dye properties and applied by the conventional dyeing and fixing methods for dyes which have a fiber-reactive group, in particular a β-thiosulfatoethylsulfonyl group, dyes polyamide fiber materials, in particular wool, and cellulose fiber materials in bright red shades having very good fastness properties, as mentioned for example for the dye of Example 1.

EXAMPLE 198

195 parts of cyanuric chloride are dissolved in 800 parts by volume of acetone; this solution is added with thorough stirring to a mixture of 1300 parts of water and 1300 parts of crushed ice with 20 parts by volume of 2N hydrochloric acid. To this suspension thus obtained is added with stirring in the course of 50 to 60 minutes a solution at pH 6.9 to 7.2 of 319 parts of 1-amino-8-naphthol-4,6-disulfonic acid, 65 parts of sodium carbonate and 2000 parts of water. The reaction of the cyanuric chloride with the aminonaphthol is carried out at a temperature between 0° and 5° C. and at pH 3 to 5. Stirring is continued until free amine is no longer detectable in a diazotization test.

The coupling component solution thus prepared has added to it a diazonium salt suspension prepared as described in Example (194). Stirring is continued for 2 hours during which the pH is raised to 6.5 to 7.0 by sprinkling in sodium carbonate a little at a time. Stirring is continued at this pH and at room temperature for a further hour. 107 parts of N-methylaniline are then added, followed a little at a time by 110 parts of sodium carbonate in order to maintain the pH at 5.0 to 6.0. This reaction solution is heated to 50° C. and is maintained at this temperature with stirring for one hour. After the reaction solution has cooled down, the azo compound formed is precipitated by means of sodium chloride, is filtered off with suction and is dried at 60° C. under reduced pressure. The result obtained is a red electrolyte-containing powder which contains the sodium salt of the compound of the formula

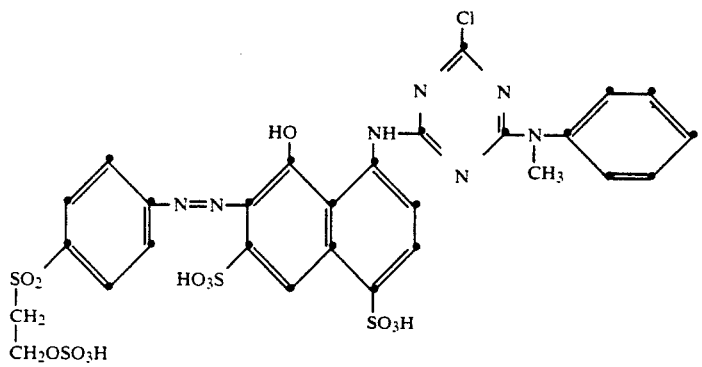

This azo compound is highly suitable for use as a dye. As a consequence of its fiber-reactive properties it produces for example on application from aqueous alkaline liquors in a conventional exhaustion or padding method deep scarlet dyeings on cotton fibers. The dyeings have very good wash and light fastness properties.

EXAMPLE 199

195 parts of cyanuric chloride are dissolved in 800 parts by volume of acetone; this solution is added with thorough stirring to a mixture of 1300 parts of water and 1300 parts of crushed ice with 20 parts by volume of 2N hydrochloric acid. To this suspension thus obtained is added with stirring in the course of 50 to 60 minutes a solution at pH 6.9 to 7.2 of 319 parts of 1-amino-8-naphthol-4,6-disulfonic acid, 65 parts of sodium carbonate and 2000 parts of water. The reaction of the cyanuric chloride with the aminonaphthol is carried out at a temperature between 0° and 5° C. and at pH 3 to 5. Stirring is continued until free amine is no longer detectable in a diazotization test.

The coupling component solution thus prepared has added to it a diazonium salt suspension prepared as described in Example 194. Stirring is continued for 2 hours during which the pH is raised to 6.5 to 7.0 by sprinkling in sodium carbonate a little at a time. Stirring is continued at this pH and at room temperature for a further hour. 925 parts of aminoacetonitrile hydrochloride are then added, followed a little at a time by 110 parts of sodium carbonate in order to maintain the pH at 5.0 to 6.0. This reaction solution is heated to 50° C. and is maintained at this temperature with stirring for one hour. After the reaction solution has cooled down, the azo compound formed is precipitated by means of sodium chloride, is filtered off with suction and is dried at 60° C. under reduced pressure. The result obtained is a red electrolyte-containing powder which contains the sodium salt of the compound of the formula

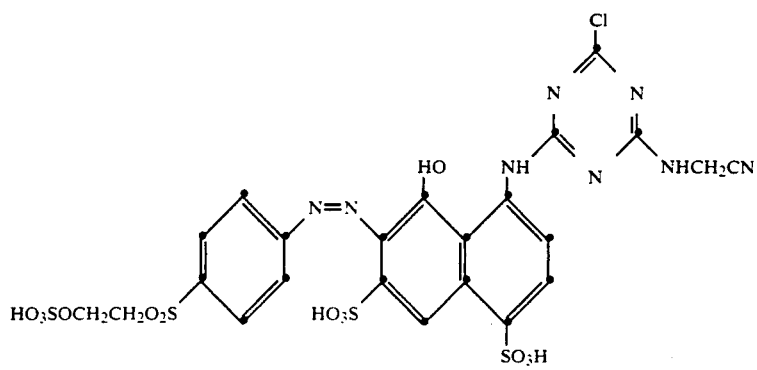

This azo compound is highly suitable for use as a dye. As a consequence of its fiber-reactive properties it produces for example on application from aqueous alkaline liquors in a conventional exhaustion or padding method deep scarlet dyeings on cotton fibers. The dyeings have very good wash and light fastness properties.

The methods described in Examples 194 to 199 can be used to prepare further useful reactive dyes of the general formula (2), the symbols $D_1$, K and Z which are listed in the table below being as defined under the formula (2) and $W_1$ being —$SO_2CH_2CH_2OSO_3H$, $W_2$ being —$SO_2CH_2CH_2SSO_3H$ and $W_3$ being —$SO_2$—$CH$=$CH_2$. The last column of the table indicates the hue obtained on cotton with the dye in question.

| Example | $D_1$ | K | Z | Hue |
|---|---|---|---|---|
| 200 | W₁—⌬— | HO NH— naphthalene with HO₃S, SO₃H | —N(CH₂CN)₂ | red |
| 201 | W₁—⌬— | HO NH— naphthalene with HO₃S, SO₃H | —NH₂ | red |
| 202 | W₁—⌬— | HO NH— naphthalene with HO₃S, SO₃H | —NH—CH₃ | red |
| 203 | W₁—⌬— | HO NH— naphthalene with HO₃S, SO₃H | —NH—⌬—H | red |

-continued

| Example | D₁ | K | Z | Hue |
|---|---|---|---|---|
| 204 | W₁–⬡ | 1-hydroxy-8-amino-3,6-disulfo-naphthyl (HO, NH–, HO₃S, SO₃H) | –N(C₂H₄OH)₂ | red |
| 205 | W₁–⬡ | 1-hydroxy-8-amino-3,6-disulfo-naphthyl | –NH(CH₂)₃OCH₃ | red |
| 206 | W₁–⬡ | 1-hydroxy-8-amino-3,6-disulfo-naphthyl | –NHCH₂CH₂OH | red |
| 207 | W₁–⬡ | 1-hydroxy-8-amino-3,6-disulfo-naphthyl | –NH–⬡ | red |
| 208 | W₁–⬡ | 1-hydroxy-8-amino-3,6-disulfo-naphthyl | morpholino (–N⌒O) | red |
| 209 | W₁–⬡ | 1-hydroxy-8-amino-3,6-disulfo-naphthyl | –NH–naphthyl–SO₃H | red |
| 210 | W₁–⬡ | 1-hydroxy-8-amino-3,6-disulfo-naphthyl | H₃S–naphthyl–SO₃H, –NH– | red |

-continued

| Example | $D_1$ | K | Z | Hue |
|---|---|---|---|---|
| 211 | $W_1$–C₆H₄– | 1-hydroxy-8-amino-naphthalene-3,6-disulfonic acid (H-acid coupled) | –NH–C₆H₄–OH (para) | red |
| 212 | $W_1$–C₆H₄– | H-acid | –NH–C₆H₄–CH₃ | red |
| 213 | $W_1$–C₆H₄– | H-acid | $-N(C_2H_4-)-C_6H_5$ (cyclic) | red |
| 214 | $W_1$–C₆H₃(SO₃H)– | H-acid | –NH₂ | red |
| 215 | $W_1$–C₆H₃(SO₃H)– | H-acid | –HN–C₂H₄OH | red |
| 216 | $W_1$–C₆H₃(SO₃H)– | H-acid | –NH–CH₂CN | red |
| 217 | $W_1$–C₆H₃(SO₃H)– | H-acid | –N(CH₂CH₂CN)₂ | red |
| 218 | $W_1$–C₆H₃(SO₃H)– | H-acid | –NH–C₆H₅ | red |

-continued

| Example | D₁ | K | Z | Hue |
|---|---|---|---|---|
| 219 | 2-Br, W₁-substituted benzene | 1-hydroxy-8-amino-3,6-disulfonaphthalene | N-methyl-N-phenyl (CH₃) | red |
| 220 | W₂-substituted benzene | 1-hydroxy-8-amino-3,6-disulfonaphthalene | amino-naphthalene-4,6-disulfonic acid | red |
| 221 | W₃-substituted benzene | 1-hydroxy-8-amino-3,6-disulfonaphthalene | N-methyl-N-phenyl | red |
| 222 | W₁, HO₃S-substituted naphthalene | 1-hydroxy-8-amino-3,6-disulfonaphthalene | N-methyl-N-phenyl | bluish red |
| 223 | HO₃S, W₁-substituted naphthalene | 1-hydroxy-8-amino-3,6-disulfonaphthalene | N-methyl-N-phenyl | bluish red |
| 224 | CH₃, W₁-substituted benzene | 1-hydroxy-8-amino-3,6-disulfonaphthalene | N-methyl-N-phenyl | bluish red |
| 225 | SO₃H-substituted benzene with -NH-C(=O)-(CH₂)₃-SO₂-CH₂-CH₂-Cl | 1-hydroxy-8-amino-3,6-disulfonaphthalene | -NH-phenyl-SO₃H | yellowish red |

-continued

| Example | D₁ | K | Z | Hue |
|---|---|---|---|---|
| 226 | benzyl with -CH₂-W₁ | 1-hydroxy-8-amino-naphthalene-3,6-disulfonic acid (methyl substituted) | -N(CH₃)-phenyl | red |
| 227 | W₁H₂C-phenyl | 1-hydroxy-8-amino-naphthalene-3,6-disulfonic acid (methyl substituted) | -N(CH₃)-phenyl | bluish red |
| 228 | phenyl-(CH₂)₂-W₁ | 1-hydroxy-8-amino-naphthalene-3,6-disulfonic acid (methyl substituted) | -N(CH₃)-phenyl | red |
| 229 | W₁-(CH₂)₂-phenyl | 1-hydroxy-8-amino-naphthalene-3,6-disulfonic acid (methyl substituted) | -N(CH₃)-phenyl | red |
| 230 | phenyl with SO₃H, NH-C(=O)-(CH₂)₃-SO₂-(CH₂)₂-Cl | 1-hydroxy-8-amino-naphthalene-3,6-disulfonic acid (methyl substituted) | -HN-phenyl-SO₃H | bluish red |
| 231 | W₁-phenyl | 1-hydroxy-8-amino-naphthalene-3,6-disulfonic acid (methyl substituted) | -N(CH₂CN)₂ | yellowish red |
| 232 | W₁-phenyl | 1-hydroxy-8-amino-naphthalene-3,6-disulfonic acid (methyl substituted) | -NH₂ | yellowish red |

-continued

| Example | D₁ | K | Z | Hue |
|---|---|---|---|---|
| 233 | W₁-C₆H₄- | 8-hydroxy-5-amino-2-methyl-naphthalene-6,?-disulfonic acid unit (HO, NH-; CH₃; HO₃S, SO₃H) | —NH—CH₃ | yellowish red |
| 234 | W₁-C₆H₄- | same K | —NH—C₆H₅ | yellowish red |
| 235 | W₁-C₆H₄- | same K | —N(C₂H₄OH)₂ | yellowish red |
| 236 | W₁-C₆H₄- | same K (SO₃H at different position) | —NH(CH₂)₃OCH₃ | yellowish red |
| 237 | W₁-C₆H₄- | same K | —NHCH₂CH₂OH | yellowish red |
| 238 | W₁-C₆H₄- | same K | —N(CH₂CH₂CN)₂ | yellowish red |
| 239 | W₁-C₆H₄- | same K | —NH—C₆H₅ | yellowish red |

-continued
| Example | $D_1$ | K | Z | Hue |
|---|---|---|---|---|
| 240 | 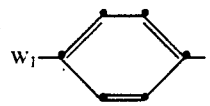 | 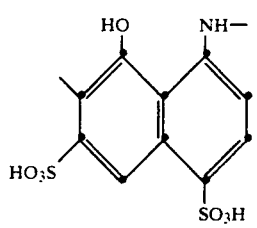 | 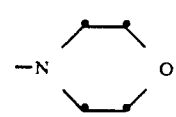 | yellowish red |
| 241 | 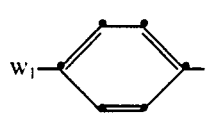 | 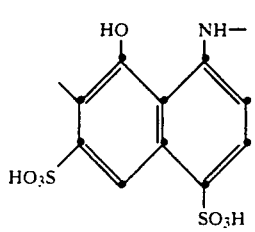 | 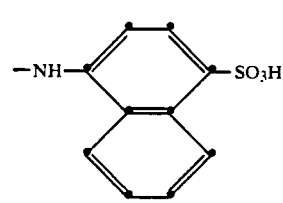 | yellowish red |
| 242 | 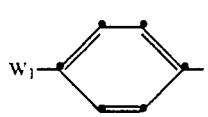 | 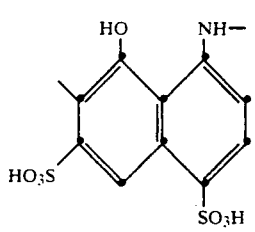 | 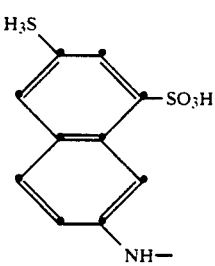 | yellowish red |
| 243 | 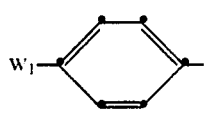 | 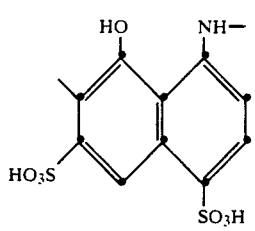 | 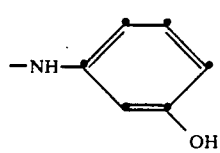 | yellowish red |
| 244 | 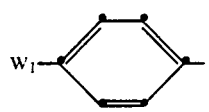 | 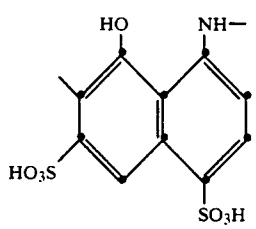 |  | yellowish red |
| 245 | 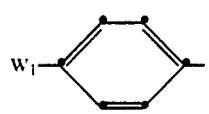 | 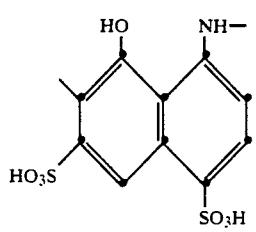 | 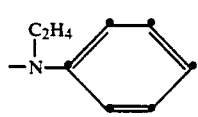 | yellowish red |

-continued

| Example | D₁ | K | Z | Hue |
|---|---|---|---|---|
| 246 | W'₁–⟨benzene⟩ | 1-hydroxy-8-amino-naphthalene-3,6-disulfonic acid (methyl substituted) | –N(CH₃)–⟨phenyl⟩ | yellowish red |
| 247 | W'₁–⟨benzene-SO₃H⟩ | 1-hydroxy-8-amino-naphthalene-3,6-disulfonic acid | –NH₂ | red |
| 248 | W'₁–⟨benzene-SO₃H⟩ | 1-hydroxy-8-amino-naphthalene-3,6-disulfonic acid | –HN–C₂H₄OH | red |
| 249 | W'₁–⟨benzene-SO₃H⟩ | 1-hydroxy-8-amino-naphthalene-3,6-disulfonic acid | –NH–CH₂CN | red |
| 250 | W'₁–⟨benzene-SO₃H⟩ | 1-hydroxy-8-amino-naphthalene-3,6-disulfonic acid | –N(CH₂CH₂CN)₂ | red |
| 251 | W'₁–⟨benzene-SO₃H⟩ | 1-hydroxy-8-amino-naphthalene-3,6-disulfonic acid | –NH–⟨phenyl⟩ | red |
| 252 | W'₁–⟨benzene-Br⟩ | 1-hydroxy-8-amino-naphthalene-3,6-disulfonic acid | –N(CH₃)–⟨phenyl⟩ | red |

-continued

| Example | D₁ | K | Z | Hue |
|---|---|---|---|---|
| 253 | (phenyl with W₂) | 1-hydroxy-8-amino-3,6-disulfonaphthalene | 6-amino-1,3-naphthalenedisulfonic acid (-HN-) | red |
| 254 | (phenyl with W₃) | 1-hydroxy-8-amino-3,6-disulfonaphthalene | N-methylaniline | red |
| 255 | (naphthyl with W₁, SO₃H) | 1-hydroxy-8-amino-3,6-disulfonaphthalene | N-methylaniline | bluish red |
| 256 | (naphthyl with SO₃H, W₁) | 1-hydroxy-8-amino-3,6-disulfonaphthalene | N-methylaniline | bluish red |
| 257 | (methylphenyl with W₁) | 1-hydroxy-8-amino-3,6-disulfonaphthalene | N-methylaniline | bluish red |
| 258 | (phenyl with SO₃H and NH-C(=O)-(CH₂)₃-SO₂-CH₂-CH₂-Cl) | 1-hydroxy-8-amino-3,6-disulfonaphthalene | 4-amino-benzenesulfonic acid | bluish red |

| Example | D₁ | K | Z | Hue |
|---|---|---|---|---|
| 259 | phenyl with -CH₂-W₁ | 1-amino-8-hydroxy-naphthalene-a,5-SO₃H with methyl and HO₃S (2-methyl-6-sulfo-8-amino-1-hydroxynaphthalene) | N-methyl-anilino (-N(CH₃)-phenyl) | red |
| 260 | W₁H₂C-phenyl | 1-amino-8-hydroxy-naphthalene with methyl, HO₃S, and SO₃H | -N(CH₃)-phenyl | bluish red |
| 261 | phenyl-(CH₂)₂-W₁ | 1-amino-8-hydroxy-naphthalene with methyl, HO₃S, and SO₃H | -N(CH₃)-phenyl | red |
| 262 | W₁-(CH₂)₂-phenyl | 1-amino-8-hydroxy-naphthalene with methyl, HO₃S, and SO₃H | -N(CH₃)-phenyl | bluish red |
| 263 | phenyl with SO₃H and NH-C(=O)-(CH₂)₃-SO₂-(CH₂)₂-Cl (methyl substituent) | 1-amino-8-hydroxy-naphthalene with methyl, HO₃S, and SO₃H | -NH-phenyl-SO₃H | red |

DYEING METHOD I 2 parts of the dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

DYEING METHOD II 2 parts of the reactive dye obtained in Example 1 are dissolved in 400 parts of water; to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

DYEING METHOD III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° C. into this bath. After 10 minutes 200 parts of a solution which contains per liter 150 g of trisodium phosphate are added. The temperature of the dye-bath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

DYEING METHOD IV 4 parts of the reactive dye obtained in Example 1 are dissolved in 50 parts of water. To this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

DYEING METHOD V 6 parts of the reactive dye obtained in Example 1 are dissolved in 50 parts of water. To this solution are added 50 parts of a solution which contains per liter 16 g of sodium hydroxide and 0.04 liter of sodium silicate. The resulting solution is applied to a cotton fabric on a pad-mangle in such a way that its weight increases by 70%, and the fabric is then wound onto a beam. In this state the cotton fabric is left to stand at room temperature for 10 hours. The dyed fabric is then rinsed, is soaped off at the boil with a nonionic detergent for a quarter of an hour, is rinsed once more and is dried.

DYEING METHOD VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% strength solution of a nonionic detergent for a quarter of an hour, is rinsed and is dried.

PRINTING METHOD I 3 parts of the reactive dye obtained in Example 1 are sprinkled with high-speed stirring into 100 parts of stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

PRINTING METHOD II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

I claim:

1. A reactive monoazo dye of the formula

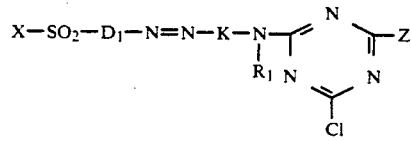

wherein
- $D_1$ is a benzene diazo component which is free from metallizable groups;
- K is a 1-amino-8-hydroxynaphthalene-3,6- or -4,6-disulfonic acid radical, which is unsubstituted or substituted by aminobenzoyl;
- $R_1$ is hydrogen or $C_1$-$C_4$-alkyl unsubstituted or substituted by halogen, hydroxy, cyano, $C_1$-$C_4$-alkoxy, $C_1$-$C_2$-alkoxycarbonyl, carboxy, aminosulfonyl, sulfato or sulfo;
- Z is —$NH_2$, N,N-di-$C_1$-$C_4$-alkylamino unsubstituted or substituted in the alkyl radical by hydroxy, cyano or $C_1$-$C_4$-alkoxy; N-$C_1$-$C_4$-alkyl-N-phenylamino unsubstituted or substituted in the phenyl ring by $C_1$-$C_4$-alkyl; cyclohexylamino; morpholino; phenylamino unsubstituted or substituted by $C_1$-$C_4$-alkyl, halogen or hydroxy; or sulfonaphthylamino;
- X is vinyl, β-sulfatoethyl, β-thiosulfatoethyl, β-chloroethyl or β-acetoxyethyl.

2. A reactive dye of claim 1 of the formula

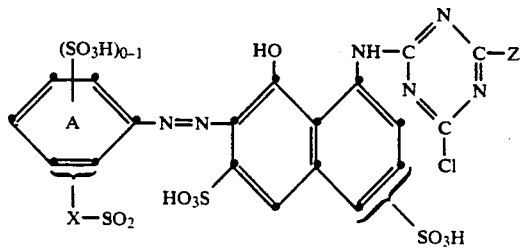

wherein the benzene ring A is unsubstituted or further substituted by halogen, $C_1$-$C_6$-alkyl or $C_1$-$C_6$-alkoxy.

3. A reactive dye of claim 1 of the formula

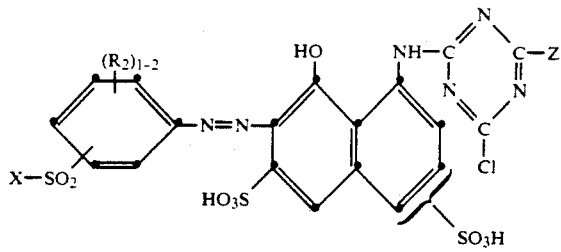

wherein $(R_2)_{1-2}$ represents 1 or 2 substituents $R_2$ which independently of each other mean $C_1$–$C_4$-alkyl, $C_1$–$C_4$-alkoxy, halogen, carboxy or sulfo.

4. A reactive dye of claim 1 of the formula

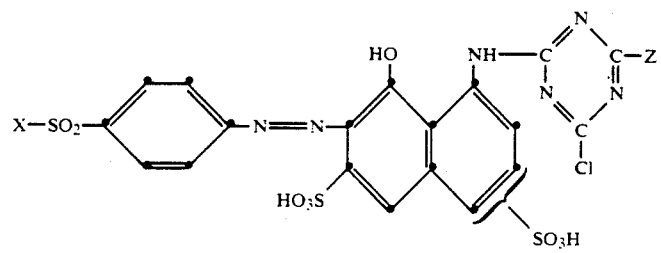

5. A reactive dye of claim 1 of the formula

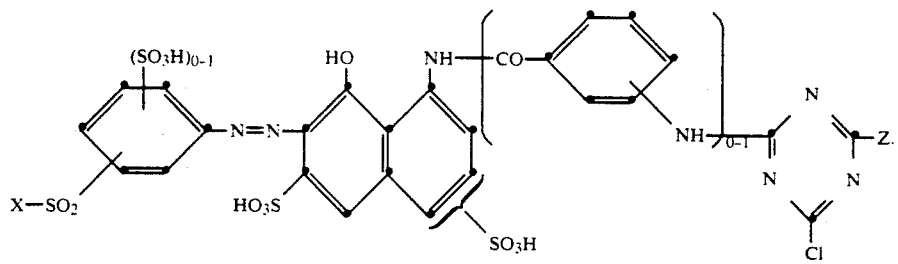

6. A reactive dye of claim 1, wherein X is vinyl or β-sulfatoethyl.

7. A reactive dye of the formula

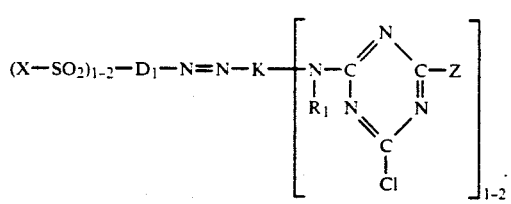

wherein $D_1$ is benzene or naphthalene diazo component;
K is a pyrazolone coupling component;
$R_1$ is hydrogen or $C_1$–$C_4$-alkyl unsubstituted or substituted by halogen, hydroxy, cyano, $C_1$–$C_4$-alkoxy, $C_1$–$C_2$-alkoxycarbonyl, carboxy, aminosulfonyl, sulfato or sulfo;
Z is —$NH_2$, $C_1$–$C_6$-alkylamino, N,N-di-$C_1$–$C_6$-alkylamino, cyclohexylamino, N,N-dicyclohexylamino, benzylamino, phenethylamino, N-$C_1$–$C_6$-alkyl-N-benzylamino, N-$C_1$–$C_6$-alkyl-N-phenethylamino; an amino radical containing a furane, thiophene, pyrazole, pyridine, pyrimidine, quinoline, benzimidazole, benzthiazole or benzoxazole; or an amino radical in which the amino nitrogen atom is a member of a morpholino, piperidino or piperazino ring; wherein $C_1$–$C_6$-alkyl, cyclohexyl, phenyl, naphthyl, benzyl, phenethyl, furane, thiophene, pyrazole, pyridine, pyrimidine, quinoline, benzimidazole, benzthiazole, benzoxazole, morpholine, piperidine, or piperazine is unsubstituted or further substituted by halogen, nitro, cyano, trifluoromethyl, sulfamoyl, carbamoyl, $C_1$–$C_4$-alkyl, $C_1$–$C_4$-alkoxy, acetylamino, benzoylamino, ureido, hydroxy, carboxy, sulfomethyl or sulfo; and
X is vinyl, β-sulfatoethyl, β-thiosulfatoethyl, β-chloroethyl or β-acetoxyethyl.

8. A reactive dye of claim 7 of the formula

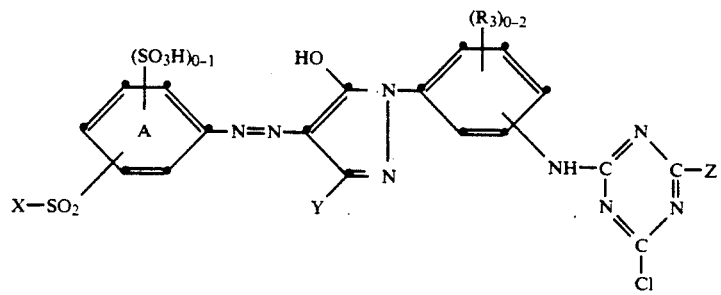

wherein
Y is —$CH_3$ or —COOH;

$(R_3)_{0-2}$ represent 0 to 2 substituents $R_3$ which independently of each other mean $C_1$–$C_4$-alkyl, $C_1$–$C_4$-alkoxy, halogen, carboxy or sulfo; and benzene ring A is not further substituted or further substituted by halogen, $C_1$–$C_6$-alkyl or $C_1$–$C_6$-alkoxy.

9. A reactive dye of claim 1, wherein Z is —$NH_2$; N-$C_1$-$C_4$-alkylamino unsubstituted or substituted in the alkyl radical by hydroxy, cyano, carboxy, $C_1$–$C_4$-alkoxy or sulfo; N,N-di-$C_1$-$C_4$-alkylamino unsubstituted or substituted in the alkyl radical by hydroxy, cyano, carboxy, $C_1$–$C_4$-alkoxy or sulfo; N-$C_1$-$C_4$-alkyl-N-phenylamino unsubstituted or substituted in the alkyl radical by sulfo and unsubstituted or substituted in the phenyl ring by $C_1$–$C_4$-alkyl; cyclohexylamino; morpholino; phenylamino unsubstituted or substituted by $C_1$–$C_4$-alkyl, halogen, hydroxy or sulfo; or sulfonaphthylamino.

10. A reactive dye of claim 8, wherein X is vinyl or β-sulfatoethyl.

* * * * *